US009760860B2

(12) United States Patent
Thompson et al.

(10) Patent No.: US 9,760,860 B2
(45) Date of Patent: Sep. 12, 2017

(54) SYSTEM AND METHOD FOR PERFORMING SUBSTITUTE FULFILLMENT

(75) Inventors: Roland R. Thompson, Malvern, PA (US); Michael S. Blackstone, Downingtown, PA (US); Ralph Julius, West Chester, PA (US)

(73) Assignee: FRONTLINE TECHNOLOGIES GROUP LLC, Malvern, PA (US)

( * ) Notice: Subject to any disclaimer, the term of this patent is extended or adjusted under 35 U.S.C. 154(b) by 526 days.

(21) Appl. No.: 13/440,892

(22) Filed: Apr. 5, 2012

(65) Prior Publication Data

US 2012/0296839 A1 Nov. 22, 2012

Related U.S. Application Data

(63) Continuation of application No. 13/367,253, filed on Feb. 6, 2012, now abandoned, which is a continuation of application No. 12/285,121, filed on Sep. 29, 2008, now abandoned, which is a continuation of application No. 09/683,093, filed on Nov. 16, 2001, now Pat. No. 7,430,519, which is a
(Continued)

(51) Int. Cl.
*G06Q 10/10* (2012.01)
*G06Q 10/06* (2012.01)

(52) U.S. Cl.
CPC ....... *G06Q 10/10* (2013.01); *G06Q 10/06311* (2013.01); *G06Q 10/063112* (2013.01); *G06Q 10/063116* (2013.01); *G06Q 10/1097* (2013.01)

(58) Field of Classification Search
None
See application file for complete search history.

(56) References Cited

U.S. PATENT DOCUMENTS 3,686,482 A 8/1972 Gelder
4,845,625 A 7/1989 Stannard
(Continued)

FOREIGN PATENT DOCUMENTS

JP 10-003492 1/1998
WO WO-98/39716 A1 9/1998
(Continued)

OTHER PUBLICATIONS

Myriad locations, student populations no longer hinder substitute management system. (Los Angeles County Office of Education uses CRS Inc's Substitute Finder educational administration software), THe Journal, Technological Horizons in Education, vol. 21, No. 4.*
(Continued)

*Primary Examiner* — Matthew Gart
*Assistant Examiner* — Akosua Kyereme-Tuah
(74) *Attorney, Agent, or Firm* — Foley & Lardner LLP

(57) ABSTRACT

A system and method for automating the performance of substitute fulfillment. The system includes a server which receives absentee information representing an absent worker via a telephone communication link or an Internet communication link. In response to receiving the absentee information, the system generates a list of potential substitute workers. The system then contacts potential substitute workers until one is found or until the list is exhausted. The system can also post a list of positions that are available on a website allowing potential substitute workers to search for a position.

17 Claims, 29 Drawing Sheets

Related U.S. Application Data continuation-in-part of application No. 09/419,266, filed on Oct. 15, 1999, now Pat. No. 6,675,151, which is a continuation-in-part of application No. 09/217,116, filed on Dec. 21, 1998, now Pat. No. 6,334,133.

(56) References Cited

U.S. PATENT DOCUMENTS

| | | | |
|---|---|---|---|
| 4,937,743 A | | 6/1990 | Rassman et al. |
| 5,111,391 A | * | 5/1992 | Fields et al. ............... 705/7.14 |
| 5,113,430 A | | 5/1992 | Richardson et al. |
| 5,117,353 A | * | 5/1992 | Stipanovich et al. ....... 705/7.14 |
| 5,164,897 A | * | 11/1992 | Clark et al. ................. 705/321 |
| 5,255,305 A | | 10/1993 | Sattar |
| 5,325,292 A | | 6/1994 | Crockett |
| 5,369,570 A | | 11/1994 | Parad |
| 5,416,694 A | | 5/1995 | Parrish et al. |
| 5,548,506 A | | 8/1996 | Srinivasan |
| 5,592,375 A | | 1/1997 | Salmon et al. |
| 5,634,055 A | * | 5/1997 | Barnewall et al. |
| 5,832,497 A | * | 11/1998 | Taylor |
| 5,862,223 A | | 1/1999 | Walker et al. |
| 5,884,270 A | | 3/1999 | Walker et al. |
| 5,911,134 A | | 6/1999 | Castonguay et al. |
| 5,913,029 A | | 6/1999 | Shostak |
| 5,913,201 A | | 6/1999 | Kocur |
| 5,918,207 A | | 6/1999 | McGovern et al. |
| 5,940,834 A | | 8/1999 | Pinard et al. |
| 5,974,392 A | | 10/1999 | Endo |
| 5,978,768 A | * | 11/1999 | McGovern et al. .......... 705/321 |
| 6,038,597 A | | 3/2000 | Van Wyngarden |
| 6,044,354 A | | 3/2000 | Asplen, Jr. |
| 6,044,355 A | | 3/2000 | Crockett et al. |
| 6,049,776 A | * | 4/2000 | Donnelly et al. ............ 705/7.14 |
| 6,058,423 A | | 5/2000 | Factor |
| 6,058,432 A | | 5/2000 | Shin et al. |
| 6,061,506 A | | 5/2000 | Wollaston et al. |
| 6,061,681 A | | 5/2000 | Collins |
| 6,064,977 A | | 5/2000 | Haverstock et al. |
| 6,192,346 B1 | * | 2/2001 | Green .......................... 705/7.16 |
| 6,253,188 B1 | | 6/2001 | Witek et al. |
| 6,266,659 B1 | | 7/2001 | Nadkarni |
| 6,272,467 B1 | * | 8/2001 | Durand et al. .................... 705/5 |
| 6,272,472 B1 | | 8/2001 | Danneels et al. |
| 6,275,812 B1 | | 8/2001 | Haq et al. |
| 6,289,340 B1 | * | 9/2001 | Puram et al. ................ 705/7.14 |
| 6,301,574 B1 | | 10/2001 | Thomas et al. |
| 6,311,192 B1 | | 10/2001 | Rosenthal et al. |
| 6,334,133 B1 | * | 12/2001 | Thompson et al. |
| 6,370,510 B1 | * | 4/2002 | McGovern et al. .......... 705/321 |
| 6,381,592 B1 | | 4/2002 | Reuning |
| 6,381,640 B1 | | 4/2002 | Beck et al. |
| 6,385,620 B1 | * | 5/2002 | Kurzius et al. |
| 6,408,337 B1 | | 6/2002 | Dietz et al. |
| 6,415,259 B1 | | 7/2002 | Wolfinger et al. |
| 6,457,005 B1 | | 9/2002 | Torrey |
| 6,466,914 B2 | | 10/2002 | Mitsuoka et al. |
| 6,470,338 B1 | * | 10/2002 | Rizzo et al. |
| 6,524,109 B1 | | 2/2003 | Lacy et al. |
| 6,564,188 B2 | * | 5/2003 | Hartman et al. ............. 705/320 |
| 6,567,784 B2 | * | 5/2003 | Bukow ........................ 705/7.14 |
| 6,587,822 B2 | | 7/2003 | Brown et al. |
| 6,662,194 B1 | * | 12/2003 | Joao ............................... 705/1.1 |
| 6,675,151 B1 | * | 1/2004 | Thompson et al. ......... 705/7.14 |
| 6,735,570 B1 | * | 5/2004 | Lacy et al. .................. 705/7.14 |
| 6,873,964 B1 | * | 3/2005 | Williams et al. ............ 705/7.14 |
| 6,904,407 B2 | * | 6/2005 | Ritzel .......................... 705/321 |
| 7,043,443 B1 | * | 5/2006 | Firestone .................... 705/7.14 |
| 7,212,985 B2 | * | 5/2007 | Sciuk .......................... 705/7.33 |
| 7,263,183 B1 | | 8/2007 | Klein et al. |
| 7,295,991 B1 | * | 11/2007 | Clarke et al. ............... 705/7.14 |
| 7,343,316 B2 | * | 3/2008 | Goto et al. .................. 705/7.16 |
| 7,430,519 B2 | * | 9/2008 | Thompson et al. ......... 705/7.14 |
| 7,945,468 B1 | | 5/2011 | Bernasconi et al. |
| 2001/0034630 A1 | * | 10/2001 | Mayer et al. ..................... 705/7 |
| 2001/0042000 A1 | * | 11/2001 | DeFoor, Jr. ...................... 705/9 |
| 2002/0029160 A1 | * | 3/2002 | Thompson et al. .............. 705/8 |
| 2002/0072946 A1 | * | 6/2002 | Richardson ...................... 705/8 |
| 2002/0087377 A1 | * | 7/2002 | Rajasenan et al. .............. 705/7 |
| 2002/0111843 A1 | * | 8/2002 | Wellenstein ..................... 705/8 |
| 2003/0009437 A1 | | 1/2003 | Seiler et al. |
| 2003/0154112 A1 | | 8/2003 | Neiman et al. |
| 2003/0204431 A1 | | 10/2003 | Ingman |
| 2004/0225550 A1 | | 11/2004 | Helander et al. |
| 2005/0010467 A1 | * | 1/2005 | Dietz et al. ...................... 705/9 |
| 2005/0114195 A1 | | 5/2005 | Bernasconi |
| 2005/0200455 A1 | | 9/2005 | Veni et al. |
| 2006/0259472 A1 | | 11/2006 | MacClellan |
| 2009/0099899 A1 | * | 4/2009 | Thompson et al. .............. 705/9 |
| 2009/0177518 A1 | | 7/2009 | Adams et al. |

FOREIGN PATENT DOCUMENTS

| | | | | |
|---|---|---|---|---|
| WO | WO9839716 | * | 9/1998 | ............ G06F 17/60 |
| WO | WO-99/17242 A2 | | 4/1999 | |
| WO | WO9917242 | * | 4/1999 | ............ G06F 17/60 |

OTHER PUBLICATIONS

Daly, Lesley, Substitute teacher shortage hits schools Mt Democrat News, Apr. 24, 1998.*
Haddad, Anne, Computer Calls for Substitutes Baltimore Morning Sun, Dec. 15, 1994.*
Stepp, Diane R., School Watch the Daily Hunt for Substitute Teachers The Atlanta Journal the Atlanta Constitution, Apr. 9, 1998.*
Duerson, Angela, Computer on Call for Teachers Atlanta Journal, Oct. 18, 1990.*
Baca, Aaron, Throwing Out the Sub Routine Now Computers, Not Secretaries, Can Find Substitutes for Absent Teachers Santa Fe Mexican, Feb. 20, 1996.*
Burden, Bernadette, School Matters Notes, Ideas, Trends in Education Computer to Help Schools Locate Substitutes ASAP Atlanta Constitution, Oct. 29, 1991.*
Martin County School District Installs Voice Processing Audiotex Update, vol. 3, No. 5, May 1991.*
Willis, William, Telephony products enhance convience, communication & distance learning The Journal, Technological Horizons in Education, vol. 23, No. 7, Feb. 1996.*
Miller, Rhonda, Intense Daily Search for Sub Teachers Starts Early Pittsburgh Post, Jan. 26, 1999.*
HotJobs.com Web Pages Hot Jobs, Feb. 8, 1998, Retrieved from Archive.org.*
CSR-Ivr.com Web Pages CSR, Inc., Nov. 1999-Oct. 2000, Retrieved from Archive.org Oct. 2, 2012.*
AESOPOnline.com Web Pages Frontline Data, Oct. 2000, Retrieved from Archive.org Oct. 2, 2012.*
U.S. Appl. No. 13/097,740, filed Apr. 29, 2011, Bernasconi, et al.
U.S. Appl. No. 90/008,803, filed Aug. 9, 2007, Thompson, et al.
U.S. Appl. No. 90/011,656, filed Jan. 6, 2012, Thompson, et al.
"Automated Substitute Finder System," Fall 1994, URL: http://www.csba.org/ssd/samples/Technology/automated.htm.
"Bellsouth annual meeting takes shareholders back to school and demonstrates education-related technologies," PR Newswire, Apr. 27, 1992 [online printed from Internet on Aug. 22, 2002].
"Myriad locations, student populations no longer hinder substitute management system," The Journal (Technological Horizons in Education), v.21, n.4, p. 50, Nov. 1993.
"'TeacherReacher' A New Feature," NEA Today v.11, Nov. 1992, issue 4, p. 19; [online printed from Internet on Aug. 22, 2002].
Adecco [online], 1997 [retrieved on Mar. 10, 2002]; 8 pages; Retrieved from Internet: <URL: http://www.Usadecco.com [online printed from Internet on Mar. 10, 2002].
Applying to a Job, Feb. 8, 1998, http://replay.waybackmachine.org/19980208125014/http://www.hotjobs.com/htdocs/answers.html#applyjob.
Arrange for Substitute Teachers Online, Aug. 1999—Telecommunications, T.H.E. Journal Online: Technological Horizons in Edu-

(56) References Cited

OTHER PUBLICATIONS cation, Jan. 2002, p. 1 of 1. Available at website: http://www.thejournal.com/magazine/vault!A2120.cfm.

ASA Staffing World Expo 2003, Oct. 27-30, Las Vegas; Exhibitors; pp. 1-7.

Aspect Telecomunications Announces Plans to Offer World Wide Web Solutions for Call Centers; New Web Interaction Capabilities for Agility Will Transform Call Centers Into Even More Powerful Customer Information Transaction Centers, Business Wire, Sep. 19, 1995, http://thefreelibrary.com/_/print/PrintArticle.aspx?id=17436173, 3 Sheets.

Automated Substitute Finder System, Remove—Duplicate.

Baca, Aaron, "Throwing out the sub routine now computers, not secretaries, can find substitutes for absent teachers," The Santa Fe New Mexican, Feb. 20, 1996 [online printed from Internet on Aug. 22, 2002.

Bridgeware Systems—Staffing Industry Software Products; 2002; pp. 1-2; retrieved from website http://www.bridgeware.net/product.htm.

Business Ware Services, Inc.—TempWizard Solutions; 2002; pp. 1-2; retrieved from website http://www.bwsi.com/tempwizard.html.

Clearview Staffing Software; Web-based scheduling and management solutions for medical staffing . . . ; 2003; pp. 1-2; Retrieved from website htt;://www.tempschedulingsystem.com/.

Computer Software Innovations, Inc., Substitute Online Demo—an online tool for managing substitute teachers, Substitute Logon, © 1999, p. 1 of 1. Available at website: http://www.subdemo.com/subdemo/webcode/4 0.html.

CRS, Inc.—Human Resource Automation, Interfacing, CRS—Interfacing Page, pp. 1-2. Available at website: http://www.crs-ivr.com/sub2-interfacing.asp.

CRS, Inc.—Human Resource Automation, Network Configurations, CRS—Network Configurations Page, pp. 1-3. Retrieved Feb. 12, 2002 from website: http://www.crs-ivr.com/sub2-networkconfigurations.asp.

CRS, Inc.—Human Resource Automation, Sub Finder, Make Every Day a Productive Day!, CRS—SubFinder Page, pp. 1-3. Available at website: http://www.crs-ivr.com/sub-subfinder.asp.

CRS, Inc.—Human Resource Automation, Technology, CRS—SubFinder Technology Page, p. 1 of 1. Retrieved Feb. 12, 2002 from website: http://www.crs-ivr.com/sub2-technology.asp.

Daly, Lesley; Substitute Teacher Shortage Hits Schools; Apr. 24, 1998 (retrieved from the Internet).

eBay Media Center: About eBay, http://news.ebay.com/about.cfm, 2 Sheets.

Eisenberg, Daniel, "We're for Hire, Just Click," Time, vol. 154, Iss. 7, Aug. 16, 1999, 3 pgs.

eSchool Solutions, SEMS Advantage version 2.8 release announced, Press Release Sep. 21, 2000, pp. 1-2. Available at website: http://www.eschoolsolutions.com/press release/StaffCenter28-5-15-01.htm.

eSchool Solutions, Substitute Employee Management System (SEMS), © 1999, 2000, 2001 eSchool, pp. 1-2. Available at website: http://www.eschoolsolutions.com/sems.htm.

eWork Launches Online Market Exchange to Meet Growing Demand for Contract Professionals; cWork's Exchange Connects Companies with Growing Force of Contract and Project-Based Pros Who Work Online; Business Editors/High-Tech Writers; Business Wire, New York, Sep. 7, 1999, p. 1.

Gellerman, Elizabeth; "Telephone technology increases communication across the board," The Journal v21, n10 p. 14(4) May 1994.

Givens, Ann. "Schools struggle to find substitute teachers." The Patriot Ledger, Dec. 20, 1997; pp. 1-5; [online printed from Internet on Mar. 10, 2002].

Goth, Greg et al., "Scarcity of IT Workers is the Mother of Recruiter Innovations," IT Pro, Mar./Apr. 1999, pp. 15-17.

Haddad, Anne, "Computer Calls for Substitutes," The Sun, Dec. 15, 1994; pp. 1-3.

Hippel et al. "Temporary employment: Can organizations and employees both win?" The Academy of Management Execution, vol. 11, pp. 93-104, Feb. 1997.

JobAlert—This Space Available, 1997; http://replay.waybackmachine.org/19980113110938/http://www.teachers.net/jobs/jobalert.

King, Kristen; EBR Schools Install System to Track Substitute Teachers; Advocate, Baton Rouge, LA, Apr. 27, 1998; pp. 1-2.

LaPlante, Joseph. "New policy drafted to overcome shortage of substitute teachers," Providence Journal—Bulletin, Apr. 23, 1996; pp. 1-2; [online printed from Internet on Mar. 10, 2002].

LaPlante, Joseph. "Two school departments struggle to fill vacancies. There's no substitute for a substitute . . . " Providence Journal—Bulletin Nov. 25, 1998 ; pp. 1-2; [online printed from Internet on Mar. 10, 2002].

National Educators Employment Review, 1996, http://replay.waybackmachine.org/19961223003640/http://www.teacherjobs.com/.

Poindexter, Joanne. "Teacher absence plan ok'd policy calls for using substitutes," Roanoke Times and World News, Aug. 9, 1996; pp. 1-2; [online printed from Internet on Mar. 10, 2002].

Prior art IVR ("interactive voice response") systems and/or services that were known and/or used and/or sold and/or offered for sale by others in one or more employment-related fields, including without limitation, IVR systems and services for use in substitute employee management that were commercially available from the Defendant at least as early as Dec. 21, 1997.

Rogers, "What's New," HRMagazine, vol. 43, Issue 5, Apr. 1998, 4 Sheets.

Stepp, Diane, "School Watch: The Daily Hunt for Substitute Teachers," The Atlanta Journal, The Atlanta Constitution, Apr. 9, 1998.

Subs are needed! Fast!; Computer Software innovations, Inc., May 21, 1999.

Substitute Online, Inc., Logon Page, © 1999, p. 1 of 1. Available at website: http://www.substituteonline.com/subOnline/webcode/main/logon.asp.

Sunoo, Brenda. "Thumbs up for staffing Web sites," Workforce v.76 n. 10 pp. 67-72, Oct. 1997.

TALX Corporation Releases TALXWare 8.1 Featuring State-of-the-Art Enhancements for Interactive Web and Interactive Voice Response, Business Wire, Aug. 27, 1997, http://www.thefreelibrary.com/_/print/PrintArticle.aspx?id+19701564 , 2 Sheets.

Teachers.net Career Center, 1997, http://replay.waybackmachine.org/19971224041521/http://teachers.net/carcers/.

Technology White Paper The Implementation of Distributed Time and Attendance Systems over Corporate Intranets and the Internet/WWW, opyrighted 1997, http://web.archive.org/web/19980201062006/f-tech.com/webtime.htm.

The assignee of U.S. Pat. No. 6,334,133 first sold a service titled "Aesop" for substitute thltillment on the Web in Jul. 1999 which did use a separate web page for and associated only with the respective substitute worker, but did not use timed availability by computer of positions.

The Hot Jobs Difference, 1998, http://replay.waybackmachine.org/19980208122614/http://www.hotjobs.com/cgi-bin/parse-file?TEMPLATE=/htdocs/difference.html.

Thomas L. Dean, "Decision Support for Coordinated Multi-Agent Planning, " ACM 1986, pp. 81-91.

US Office Action on U.S. Appl. No. 09/641,866 mailed Jun. 15, 2005; 16 pages.

USPTO Notice of Allowance on U.S. Appl. No. 09/641,866 dated Mar. 14, 2011; 27 pages.

USPTO Office Action on U.S. Appl. No. 09/641,866 dated May 29, 2009; 38 pages.

USPTO Office Action on U.S. Appl. No. 09/641,866 mailed Nov. 18, 2003; 21 pages.

USPTO Office Action on U.S. Appl. No. 09/641,866 mailed Dec. 9, 2002; 14 pages.

USPTO Office Action on U.S. Appl. No. 09/641,866 dated Dec. 17, 2008; 29 pages.

(56) References Cited

OTHER PUBLICATIONS

USPTO Office Action on U.S. Appl. No. 09/641,866 dated Aug. 17, 2009; 34 pages.
USPTO Office Action on U.S. Appl. No. 11/643,769 mailed Apr. 27, 2010; 35 pages.
USPTO Office Action on U.S. Appl. No. 12/285,121 dated Aug. 8, 2011; 17 pages.
USPTO Office Action on U.S. Appl. No. 12/285,371 dated Jun. 22, 2011; 22 pages.
USPTO office action on U.S. Appl. No. 13/097,740 dated Oct. 3, 2011; 20 pages.
USPTO Office Action on U.S. Appl. No. 09/641,866 mailed Feb. 1, 2010; 36 pages.
USPTO Office Action on U.S. Appl. No. 09/641,866 mailed Aug. 3, 2010; 44 pages.
Web-On-Call Voice Browser Redefines Access to the Web; Organizations Can Now Extend Their Reach Beyond the Net, Business Wire, Mar. 4, 1996, http://www.thefreelibrary.com/_/print/PrintArticle.aspx?id+18052502 , 2 Sheets.
Willis, William. "Telephony products enhance convenience, communication & distance learning," The Journal v23 n7 p. 12(4), Feb. 1996.
Wilson, Carol. "The start of something big," Telephony, Jul. 6, 1992 [online printed from Internet on Aug. 22, 2002].
Work, Deborah; In a Class by Itself Revolutionary Computer Finds Substitute Teachers—Sometimes more than Needed; Apr. 1, 1991, Sun Sentinel, Fort Lauderdale.
Declaration of Becky Hearn, 3 pgs, Sep. 20, 2011.
Declaration of James Carpenter, 16 pgs, Sep. 21, 2011.
Declaration of Jesse Foley, 3 pgs, Sep. 22, 2011.
Declaration of Roland Thompson, 17 pgs, Mar. 30, 2012, with a listing of the National Center for Education Statistics, Common Core of Data (CCD) Local Education Agency Universe Survey: 1998-99, attached as Exhibit A.
Request for Ex Parte Reexamination for U.S. Pat. No. 7,430,519, U.S. Appl. No. 90/011,656, filed Apr. 21, 2011, 85 pgs.
US Office Action on U.S. Appl. No. 90/011,656 mailed Jan 6, 2012, 50 pages.
Case 2:07-cv-02457-ER, Document 104, Jul. 26, 2012, pp. 1-45.
US Notice of Allowance in U.S. Appl. No. 13/097,740 dated Jul. 27, 2012.
Office Action received in U.S. Appl. No. 90/011,656 dated Aug. 23, 2012.
Office Action dated Nov. 19, 2012 issued in connection with U.S. Appl. No. 13/422,733.
Declaration of Mr. Jerald A. Jellets dated Feb. 16, 2009, 4 pages.
Declaration of Mr. James Carpenter dated Feb. 18, 2009, 9 pages.
Final Office Action mailed Jun. 17, 2013 issued in connection with U.S. Appl. No. 13/422,733.

* cited by examiner

| STAFF | |
|---|---|
| Name | 92 |
| Title | 94 |
| Social Security Number | 96 |
| Pin | 98 |
| Cross reference to billing contact | 100 |
| Certification(s) | 102 |
| Substitute preferences | 104 |
| Schedule manipulation | 106 |
| Absence record | 108 |
| School reference | 110 |
| District reference | 112 |
| County reference | 114 |
| E-mail address | 116 |
| Fax number | 118 |
| Room/Office number | 120 |
| Special flag for recorded messages | 122 |
| Entitlement balances | 124 |
| Availability | 126 |
| Call time preferences | 128 |

| Business Data | |
|---|---|
| Billing address | 132 |
| Mailing address | 134 |
| Billing contact | 136 |
| Emergency contact<br>Evening<br>Weekend<br>Business | 138 |
| Phone number | 140 |
| Fax number | 142 |
| E-mail | 144 |
| PO # | 146 |
| Options turned on | 148 |

Pick-Lists (150)
- Field preferences / Required / Visible / Default data — 152
- Field data / Type — 154
- Certification — 156
- Entitlement types — 158
- People — 160
- Schools — 162
- District — 164

FIG. 5

School Data (166)
- Name — 168
- Code — 170
- Type — 172
- Principal — 174
- Fax — 176
- Assign fax list — 178
- Phone — 180
- Secretary — 182
- Assign substitute — 184
- Assign staff — 186
- Record/Play — 188

| County Data | |
|---|---|
| Name | 192 |
| Code | 194 |
| State | 196 |
| Associate districts | 198 |
| Assign substitutes | 200 |

| District Data | |
|---|---|
| Name | 204 |
| Code | 206 |
| District address | 208 |
| Phone | 210 |
| Fax | 212 |
| Assign fax list | 214 |
| Administrator/Board secretary | 216 |
| Associate schools | 218 |
| Assign substitutes | 220 |
| Assign staff | 222 |
| Record/Play | 224 |

| Preferences |
|---|
| Options<br>Calling numbers<br>Select internet/intranet calling profiles<br>Password<br>Key value  /228 |

*FIG. 9*

| Reports | |
|---|---|
| Acceptance/refusal history | 232 |
| Call History | 234 |
| Unfulfilled | 236 |
| Teacher manifest<br>Trend analysis | 237 |
| Substitute manifest | 238 |
| School manifest | 240 |
| Substitute performance<br>Acceptance rating<br>Flexibility rating<br>Trend analysis | 242 |
| Staff attendance | 244 |
| Staff calendars | 246 |
| Assignment reports<br>School<br>District<br>County | 248 |

| Wizard | |
|---|---|
| Phone | 252 |
| Emergency phone | 254 |
| Contact | 256 |
| Billing address | 258 |
| District | 260 |
| Title | 262 |
| Number of teachers (approx.) | 264 |
| Number of support staff (approx.) | 266 |
| Fax number | 268 |
| E-mail address optional | 270 |
| Billing contact optional | 272 |

ABSENTEE REPORT

Date: 1/8/98                Time: 14:40:08

276 — 
| Name | Social Security # | Phone # | Title | Time | Location |
|------|-------------------|---------|-------|------|----------|
| Smith, John, T. | 005-75-2243 | (609)-555-1111 | Social Studies | 14:39:50 | Howard |
|  | Date: | 1/8/98 |  |  |  |
|  | Type: | Sick |  |  |  |
|  | F/H Day: | Half Day/PM |  |  |  |

SUBSTITUTE ASSIGNMENT REPORT

Date: 1/8/98                Time: 17:08

278 — 
Name: Smith, John, T.                SSN: 005-75-2243
Title: Social Studies gr 8           School ID: 011
Location: Howard                     School: 50 South School Street Substitute Information
    Name: Smith, Charles        SSN: 005-76-2214
    Contact Date: 1/8/98        Time: 17:06

CALL HISTORY REPORT

Date: 1/8/98                Time: 17:08

279 — 
Name: Smith, John, T.    SSN: 005-75-2243

| Date | Time | Line | Status | Sub |
|------|------|------|--------|-----|
| 1/8/98 | 17:04 | Answer | No Contact | Smith, Mark, C. |
| 1/8/98 | 17:05 | Answer | Rejected | Jones, Pat, B. |
| 1/8/98 | 17:06 | Answer | Accepted | Smith, Charles D. |

UNFULFILLED SUBSTITUTE ASSIGNMENT REPORT

Date: 1/8/98                Time: 19:10

280 — 
Name: Hitchens, Jack, R.             SSN: 008-73-2278
Title: English gr 11                 School ID: 012
Location: Blair                      School: 123 South Main Street

*FIG. 12*

| States | Events | | | | | |
|---|---|---|---|---|---|---|
| ST = State Transition | Start | Receive a call | Receive Valid Input | Receive Invalid Input | Timeout | Max Retries Reached |
| Telephony Application | | | | | | |
| Teacher Call-in | | | | | | |
| 281 Initial | Prompt for SS Number | Take phone offhook; Generate "Start" Event | ST: MainMenu | ST: ErrorState | ST: Hangup | N/A |
| 282 MainMenu | "1" Record Absence; "2" Listen to Entitlement Day Balances; "3" Special Instructions | N/A | "1" Pressed ST: Whenstep 1; "2" Pressed, Entitlements | Play Error Message; Generate "Start" Event | Play Error Message; Generate "Start" Event | ST: Goodbye |
| 283 Whenstep 1 | "1" Today; "2" Another Day | N/A | "1" ST: Shift; "2" ST: WhenAnotherDay | Play Error Message; Generate "Start" Event | Play Error Message; Generate "Start" Event | ST: Goodbye |
| 284 WhenAnotherDay | Prompt for day of the month followed by the "#" sign | N/A | ST: Shift | Play Error Message; Generate "Start" Event | Play Error Message; Generate "Start" Event | ST: Goodbye |
| 285 Shift | "1" Full Day; "2" Half day AM; "3" Half day PM; | N/A | ST: Absence Type or if required ST: StartTime | Play Error Message; Generate "Start" Event | Play Error Message; Generate "Start" Event | ST: Goodbye |
| 286 StartTime | Prompt for a military time | N/A | ST: Absence Type | Play Error Message; Generate "Start" Event | Play Error Message; Generate "Start" Event | ST: Goodbye |
| 287 Absence Type | List Valid Absence Types from database | N/A | ST: ConfirmAbsence or if required ST: RecordInstructions | Play Error Message; Generate "Start" Event | Play Error Message; Generate "Start" Event | ST: Goodbye |
| 288 RecordInstructions | Play instructions for recording a message | N/A | ST: ConfirmAbsence | Play Error Message; Generate "Start" Event | Play Error Message; Generate "Start" Event | ST: Goodbye |

FIG. 13A

| | 1 | 2 | 3 | 4 | 5 | 6 | 7 | 8 |
|---|---|---|---|---|---|---|---|---|
| 289 | ConfirmAbsence | Replay contents of absence, prompt user to comfirm; | N/A | "1" Pressed, ST: CheckComplete; "2" Pressed. ST: WhenAnotherDay | Play Error Message; Generate "Start" Event | Play Error Message; Generate "Start" Event | ST: Goodbye | |
| 290 | CheckComplete | Press "1" Complete call and get confirmation number; "2" Enter an additional absence day; | N/A | "1" Pressed, ST: Goodbye; "2" Pressed. ST: WhenAnotherDay | Play Error Message; Generate "Start" Event | Play Error Message; Generate "Start" Event | ST: Goodbye | |
| 291 | Entitlements | List Entitlement Day Balances, ST: MainMenu | N/A | N/A | N/A | N/A | N/A | |
| 292 | ErrorState | Play standard error message; ST: Goodbye | N/A | N/A | N/A | N/A | N/A | |
| 293 | Hangup | Hangup Phone ST: End | N/A | N/A | N/A | N/A | N/A | |
| 294 | Goodbye | Play goodbye message; ST: Hangup | N/A | N/A | N/A | N/A | N/A | |

Fig. 13B

| States | Events | | | | | |
|---|---|---|---|---|---|---|
| ST = State Transition | Start | Receive a call | Receive Valid Input | Receive Invalid Input | Timeout | Max Retries Reached |
| School Administration Call-in | | | | | | |
| 295 MainMenu | Press "1" School Menu; Press "2" Entitlement Types Menu | N/A | "1" Pressed ST: RecordSchoolMenu; "2" Pressed ST: RecordEntTypesMenu | Play Error Message; Generate "Start" Event | Play Error Message; Generate "Start" Event | ST: Goodbye |
| 296 RecordSchoolMenu | Prompt for valid School Recording ID | N/A | ST: RecordSchool, or if "#" pressed ST: MainMenu | Play Error Message; Generate "Start" Event | Play Error Message; Generate "Start" Event | ST: Goodbye |
| 297 RecordSchool | Play existing recording, if exists then prompt "1" to record new prompt, "#" to return to School Menu | N/A | "1" Pressed, record/verify prompt, ST: RecordSchoolMenu; "#" ST: RecordSchoolMenu | Play Error Message; Generate "Start" Event | Play Error Message; Generate "Start" Event | ST: Goodbye |
| 298 RecordEntTypesMenu | Prompt for valid Entitlement Type Recording ID | N/A | ST: RecordEntTypes, or if "#" pressed ST: MainMenu | Play Error Message; Generate "Start" Event | Play Error Message; Generate "Start" Event | ST: Goodbye |
| 299 RecordEntTypes | Play existing recording, if exists then prompt "1" to record new prompt, "#" to return to Entitlement Menu | N/A | "1" Pressed, record/verify prompt, ST: RecordEntTypesMenu; "#" ST: RecordEntTypesMenu | Play Error Message; Generate "Start" Event | Play Error Message; Generate "Start" Event | ST: Goodbye |
| 300 ErrorState | Play standard error message; ST: Goodbye | N/A | N/A | N/A | N/A | N/A |
| 301 Goodbye | Thank caller for using system; ST: Hangup: | N/A | N/A | N/A | N/A | N/A |
| 302 Hangup | Hangup Phone ST: End | N/A | N/A | N/A | N/A | N/A |

FIG. 13C

| States | | Events | | | | | |
|---|---|---|---|---|---|---|---|
| ST = State Transition | Start | Receive a call | Receive Valid Input | Receive Invalid Input | Timeout | Max Retries Reached | |
| FrontLine Administration Call-in | | | | | | | |
| 303 — RecordFilesMenu | Prompt for the recording ID of the message file | N/A | ST: RecordFiles | Play Error Message; Generate "Start" Event | Play Error Message; Generate "Start" Event | ST: Goodbye | |
| 304 — RecordFiles | Play existing recording, if exists then prompt "1" to Record new prompt, "#" to return to Record Files Menu | N/A | "1" Pressed, record/verify prompt, ST: RecordFiles; "#" ST: RecordFiles | Play Error Message; Generate "Start" Event | Play Error Message; Generate "Start" Event | ST: Goodbye | |
| 305 — ErrorState | Play standard error message; ST: Goodbye | N/A | N/A | N/A | N/A | N/A | |
| 306 — Goodbye | Thank caller for using system; ST: Hangup: | N/A | N/A | N/A | N/A | N/A | |
| 307 — Hangup | Hangup Phone ST: End | N/A | N/A | N/A | N/A | N/A | |

FIG. 13D

| States | | Events | | | | |
|---|---|---|---|---|---|---|
| ST = State Transition | Start | Receive a call | Receive Valid Input | Receive Invalid Input | Timeout | Max Retries Reached |
| Substitute Call-out | | | | | | |
| 308 MakeTheCall | Dial the telephone number; ST: CallAnalysis | N/A | N/A | N/A | N/A | N/A |
| 309 CallAnalysis | Determine how the call was or was not answered | N/A | Person Answers; ST: Identify | Person does not answer; | N/A | N/A |
| 310 Identify | Prompt for SS Number or PIN Number | N/A | ST: PresentRequest | Generate "Start" Event | N/A | ST: Goodbye |
| 311 PresentRequest | Play request, prompt substitute to "1"Replay; "2"Accept, "3"Reject | N/A | "1"Replay, Generate Start Event; "2" ST: AcceptRequest; "3" ST: RejectRequest | Play Error Message; Generate "Start" Event | Play Error Message; Generate "Start" Event | ST: Goodbye |
| 312 RejectRequest | Reject w/No more calls; "2"Reject allowing for additional calls | N/A | ST: Goodbye | Play Error Message; Generate "Start" Event | Play Error Message; Generate "Start" Event | ST: Goodbye |
| 313 AcceptRequest | Play confirmation number; ST: Goodbye | N/A | N/A | N/A | N/A | N/A |
| 314 ErrorState | Play standard error message; ST: Goodbye | N/A | N/A | N/A | N/A | N/A |
| 315 Goodbye | Thank caller for using system; ST: Hangup: | N/A | N/A | N/A | N/A | N/A |
| 316 Hangup | Hangup Phone ST: End | N/A | N/A | N/A | N/A | N/A |

FIG. 13E

| States | | Events | | | | | |
|---|---|---|---|---|---|---|---|
| ST = State Transition | Start | Receive a call | Receive Valid Input | Receive Invalid Input | Timeout | Max Retries Reached |
| Fax Callout | | | | | | |
| 317 — MakeTheCall | Call FaxNumber ST: CallAnalysis | N/A | N/A | N/A | N/A | N/A |
| 318 — CallAnalysis | Determine if Fax Answered | N/A | Fax Answered ST: FaxSend | Fax did not Answer ST: Hangup | N/A | N/A |
| 319 — FaxSend | Send Fax ST: End | | | | | |
| 320 — ErrorState | Play standard error message; ST: Goodbye | N/A | N/A | N/A | N/A | N/A |
| 321 — Goodbye | Thank substitute using system; ST: Hangup; | N/A | N/A | N/A | N/A | N/A |
| 322 — Hangup | Hangup Phone ST: End | N/A | N/A | N/A | N/A | N/A |

FIG. 13F

| Client | Events | | | | | | | | | | |
|---|---|---|---|---|---|---|---|---|---|---|---|
| States | Have Data | Don't Have Data | File Created | Connect FTP | Did Not Connect to FTP | File not there | Max Tries | Startup | Bad format | Save | |
| 323 Extract | Create file ST: Send | Create File ST: Send | | | | | | | | | |
| 324 Send | | | Create FTP Session; Send File | Verify file was sent ST: Receive; Else ST: Error | | | Error | | | | |
| 325 Receive | | | | | | Check for file if pres. ST: Import Else ST: Wait | Error | | | | |
| 326 Import | | | | | | | | Opens files; Verify file format | Refuse all Changes | Save Changes | |
| 327 Cleanup | | | | | | | | Moves files to archive; Sets last sync dates for all files | | | |
| Error | | | | | | | | | | | |

| Server | Events | | | | | | | | | | |
|---|---|---|---|---|---|---|---|---|---|---|---|
| States | File Found | Startup | | | | | | | | | |
| 328 Wait | Create File ST: Import Object | | | | | | | | | | |
| 329 Import Object | | Opens; Verifies; Reads; Saves or discards; | | | | | | | | | |
| 330 Extract | Create File ST: Import Object | Create export file; ST: Send | | | | | | | | | |
| 331 Send | | Close file; copies to FTP site | | | | | | | | | |

FIG. 13H

SYSTEM AND METHOD FOR PERFORMING SUBSTITUTE FULFILLMENT

CROSS REFERENCE TO RELATED APPLICATIONS

This application is a Continuation of U.S. application Ser. No. 13/367,253, filed Feb. 6, 2012, which is a Continuation of U.S. application Ser. No. 12/285,121, filed Sep. 29, 2008, incorporated herein by reference in its entirety, which is a Continuation of U.S. application Ser. No. 09/683,093, filed Nov. 16, 2001, now U.S. Pat. No. 7,430,519 B2, incorporated herein by reference in its entirety, which is a Continuation-In-Part of U.S. application Ser. No. 09/419,266, filed Oct. 15, 1999, now U.S. Pat. No. 6,675,151 B1, incorporated herein by reference in its entirety, which is a Continuation-In-Part of U.S. application Ser. No. 09/217,116, filed Dec. 21, 1998, now U.S. Pat. No. 6,334,133 B1 incorporated herein by reference in its entirety.

BACKGROUND OF INVENTION

1. Technical Field

The present invention relates to a human resource management system. More specifically, this invention relates to a human resource management system for performing substitute fulfillment, compiling absence and entitlement information, notifications of unexpected events, schedules, instructional information, and notifications of benefits and policies.

2. Background Information

To date, locating a substitute to fill a temporary employee absence in an organization, a process referred to as "substitute fulfillment," has generally been an unreliable, labor-intensive, and often panic-driven process. In any organization, the absence of a worker can have tangible consequences throughout the workplace. The effects of an employee absence vary with the nature of the work environment and with the scope of the employee's position. For example, upcoming deadlines and patterns of absenteeism can have different consequences within a particular organization. These consequences may be immediate and drastic, as when an assembly line shuts down due to the absence of a critical worker on the line or an airline pilot is not able to report to duty, or more attenuated and moderate, as when another employee is distracted from his primary task to answer telephones due to the absence of the office receptionist. These consequences may also include diversion of management resources to address the consequences of the absence; delays in accomplishing projects in which the absentee has a role; displacement of other employees who must fulfill the absentee's role, either by express assignment or in order to complete their own tasks; reduced productivity; fines levied against the organization, particularly if the absence impacts safety or other government-regulated aspects of the work environment; and, in an extreme but not uncommon case, the inability to complete the central task of the organization.

In the latter case, assignment of a substitute worker is imperative or "mission-critical" —without the substitute worker, the mission of the organization will not go forward. In this instance, filling the vacancy with a temporary substitute is the only acceptable alternative. In other cases, assignment of a substitute worker may not be mission-critical, but may nevertheless be a preferred policy in order to minimize the consequences of any absence. As a result, an upcoming absence may impact the workplace even before the absence period begins, as managers consider ways of compensating for the absence. Examples of work environments in which substitute fulfillment may be a mission-critical task include schools, emergency services, security services, airlines, and manufacturing plants, particularly plants with an assembly-line operation. The substitute of an absent teacher with a substitute teacher is a commonly occurring example of a mission-critical substitute-fulfillment objective.

Thus, when an employee notifies the organization that the employee will be absent, in an organization where a substitute is necessary or desired, management must necessarily turn its attention to the substitute fulfillment task or risk a noticeable reduction in the productivity of the organization or an inability to accomplish the business of the organization for the entire absence period. Although seemingly simple in concept, the substitute fulfillment task is non-trivial, requiring managers to devote significant time, effort and other resources, with no guarantee of success. The number of intermediate tasks that must be accomplished and constraints that must be satisfied to successfully realize a particular substitute in a timely manner complicates substitute fulfillment.

The absent worker often provides notice of his or her impending absence less than a day, or even only several hours, before the worker is expected at work. Thus, management typically enters the substitute fulfillment task with little time to carry it out. Should there be no automation of the process in any aspect, then management must direct each step of the process.

Once the absence, which may extend from only hours to several days, or even months, is known, management must typically identify the scope of the absentee worker's critical responsibilities and skills to establish criteria for identifying a suitable substitute and develop a substitution candidate profile. Typically, multiple substitution candidate profiles may be established, with more demanding requirements for ideal or preferred substitutes, and with less demanding, threshold requirements for merely acceptable substitutes. Once the appropriate qualifications for an acceptable substitute are established, management may consider potential substitutes from a prepared list of candidates, or alternatively, management may identify potential candidates by some other means. Candidates may be regular employees of the affected workplace, for example, assembly line workers at a manufacturing plant who work different shifts from the absentee, or, persons from outside the workplace, for example, substitute teachers registered with a school district.

Management must then contact potential substitutes, typically by telephone, and determine whether potential substitutes are available and willing to work at the desired times in the desired position. Merely reaching potential substitutes may require several attempts. In the best case, management will eventually locate and assign an available substitute to cover the vacancy. In the worst case, management will be unable to find a substitute, despite having expended significant resources on the substitute fulfillment task. The substitute fulfillment task is substantially, but not wholly, complete when the available substitute is assigned. Typically, management performing the substitute fulfillment must then notify the appropriate persons that a substitute has been confirmed to facilitate inclusion of the substitute in the workplace. Due to the complexity of the substitute fulfillment task and the diversion of resources it entails, many workplaces may forego substitute fulfillment despite its desirability.

Substitute fulfillment is a routine practice in the education system, especially at the primary and secondary school levels. An example of substitute fulfillment for a high school teacher is provided herein as an accessible example and for reference. The substitute fulfillment task usually is triggered in a school when a teacher "calls in sick." Depending on the degree to which substitute fulfillment is automated in the school or district, locating a substitute teacher may require the efforts of a principal or other administrator, as well as several support staff members. Once a teacher has called in sick or otherwise signaled his absence, perhaps the night before or even the morning of the absence, the responsible administrator must disrupt her schedule to focus on the substitute fulfillment task. If she is unable to find a substitute teacher, the operation of the class, the department, and even the whole school may be disrupted. For example, the affected classes may fall behind in their scheduled curricula, an administrator or other teachers may have to neglect their other duties to cover for the absentee, and/or the school may be fined by the state for failing to provide an acceptable substitute teacher.

In order to perform the substitute fulfillment, generally the administrator first must determine which classes the absent teacher teaches and what skills are required of a substitute. For example, if an absent teacher is a high school science teacher who teaches AP Physics and basic chemistry, a substitute may be required not only to have a college degree but also specifically to have pursued college-level classes in both subjects. The administrator may then identify acceptable substitutes from those substitutes registered with the school district. The administrator then telephones potential substitutes to check their availability and willingness to take on the assignment. Often, the administrator may have to telephone an individual substitute several times to speak with the individual substitute and obtain a response. If the administrator locates and confirms a substitute, the administrator then has to inform the relevant school head or other teachers and complete paperwork for processing the substitute assignment.

Presently, computer systems for supporting substitute fulfillment are known in the education field. Individual schools in a school district typically share a single such system installed at the school district level. Typical system equipment includes at least one dedicated computer, combined with specialized telephony equipment, including multiple phone lines, and other equipment. The equipment is expensive and set-up of the substitute fulfillment system may be technically demanding. A school district must invest in equipment adequate to handle its anticipated volume of use. In order to upgrade the system, often all of the equipment must be replaced, at substantial expense and inconvenience.

In these automated systems, necessary information relating to teachers, substitution criteria, registered substitutes, etc., is entered and maintained in a database through software on the system at the school district level. Individual schools may receive daily absence information from the school district office via facsimile. School district personnel must receive absence notification and initiate and oversee the substitute fulfillment procedure with support from the system. Significant involvement by school district personnel and the system vendor may be required, including hardware and software support of the system.

In light of the mission-critical nature of the substitute fulfillment task in the education system, the reliability of the system is a key concern. At present, substitute fulfillment systems are not adequately reliable. Power failures, computer network interruptions, telephone outages, computer system failures, unauthorized tampering, computer security crime, and other catastrophic events may undermine the efficacy of systems operated at the school district level. Because all information is maintained locally at the school district level, system failures may result in partial or total data loss. Backup systems entail additional expense, often not within the budgets of school systems.

Present systems are inherently limited in their capabilities due to equipment limitations, access constraints, and operation requirements; thus, each district typically purchases and installs a system and independently handles its own substitute fulfillment using the purchased system. As a result of the decentralized nature of substitute fulfillment management in present systems, it is virtually impossible for school districts to share information and common substitute fulfillment resources. For the same reason, compilation or aggregation of data relating to substitute fulfillment across school districts is difficult and uncommon. All of the costs, responsibilities, disadvantages, and inconveniences of substitute fulfillment are typically borne exclusively and separately by individual school districts and schools.

Additionally, organizations including but not limited to schools, school districts and business entities require a centralized system and method of tracking workers" absences and entitlements, including but not limited to used and available vacation, personal and sick time. Administrators and workers have a time-consuming, inefficient and often inaccurate procedures for recording absences and entitlements. This results in labor-intensive recordation procedures and often no universal record (for access by both administrators and workers) detailing up-to-date absences and entitlements for the particular worker, a group of workers, or the overall workforce of the organization.

Organizations also require an efficient, current and easily accessible system and method for recording and announcing benefits, policies, current and unexpected events. Presently, organizations often resort to bulletin boards, which are not remotely accessible, or phone chains, which are inefficient, unreliable, and labor-intensive.

Illustrated here with particular examples, these same considerations are generally applicable to any organization. Due to the mission-critical nature of these tasks, it is crucial that any equipment or method relating to substitute fulfillment, information compilation or notification be reliable and efficient. It is an advantage of the present invention to provide a reliable, efficient system and method of substitute fulfillment, information compilation and notification. It is a further advantage of the present invention to provide an automated system and method that has low overhead and requires little organization involvement or oversight. It is another advantage of the present invention to broaden the scope of system connectivity and to include an interface to the Internet. It is yet another advantage of the present invention to maintain a central database of related information and to process data across multiple independent organizations. It is still another advantage of the present invention to provide trend analysis and reporting. A system and method for substitute fulfillment, information compilation and notification is useful to any organization that anticipates a need to assign substitute workers to fill temporary absences.

SUMMARY OF INVENTION

The present invention is directed to an automated system and method for performing substitute fulfillment for an organization that wishes to replace an employee during a temporary absence; performing placement of floating workers; tracking absences and entitlements of workers; notifying interested parties regarding unexpected events, daily announcements, policies and benefits; and bidding for temporary workers. In a preferred embodiment, the substitute fulfillment system includes a server configured for managing substitute fulfillment, compiling information, and notifying parties for multiple client organizations. The server maintains substitute fulfillment data, contact data, notification information and other data in a database for one or more client organizations employing the system. Organizations enter substitute fulfillment data and contact data via a website hosted by the server. The system sends updates to and receives updates from an organization's local database via the Internet or a telephone network.

In a preferred embodiment, an employee registers an absence by contacting the substitute fulfillment system. In another preferred embodiment, a business entity such as a school or school district registers contact information and the system contacts the desired parties regarding unexpected events, benefits, policies or daily announcements. Yet another embodiment encompasses a system which tracks information regarding workers" absences and entitlements.

In a preferred embodiment, the system provides the organization with the absence information. Once an absence is registered, the substitute fulfillment system uses the database to identify potential substitutes, temporary workers or floating workers ("substitutes") based on preferences or matching criteria selected by the organization and other information. The system then contacts the identified potential substitutes to inquire regarding their availability. In a preferred embodiment, the system continues to contact potential substitutes until one accepts the assignment or until the list is exhausted and all potential substitutes have refused the assignment.

If a substitute accepts the assignment, the system relays instructions, key information and messages from the worker to the substitute, if necessary. Whether or not a substitute is successfully assigned, the system contacts the organization and other desired recipients to report on the result. In a preferred embodiment, the system relies on multiple communications channels to ensure reliability.

The system can also track the absences of each particular worker and the worker's entitlements. Upon accessing the system, the worker or an administrator can inquire about the worker's absences and entitlements. The system stores the information on the absences and entitlements in the database.

In another embodiment, the system records announcements regarding unexpected or current events, benefits or policies when the system is accessed by an authorized party for this purpose. The system then contacts the interested parties regarding the announcement, or allows the interested parties to access the announcement upon request. Additionally, if desired, reports detailing the contacted parties and the parties with which contact has been unsuccessful may be generated.

In another embodiment, the system can receive registration information from substitute workers who are not affiliated with a specific client. The registrant's information and professional skills can be made available to interested clients who will, upon approval, use this substitute worker for placement in their organization.

In another embodiment, the system allows substitutes to select positions available with multiple unaffiliated organizations. The substitute worker can manage their availability and work schedule across these multiple non-affiliated organizations.

In another embodiment, the system retrieves a list of available jobs and displays the list to a substitute worker once the substitute worker establishes a connection with the computer network. The substitute worker is able to select a position from the list without having to access the website, e.g., using an instant messaging system.

In yet another embodiment, the system is able to conduct auctions of idle temporary workers. An organization that requires temporary workers may designate the skills and background required of the worker, the date and time for the position, as well as with the price the organization is willing to pay. The system then fulfills these requests starting with the highest bidder.

It is understood that "workplace" or "organization" or "entity", when used in this application, refers not only to more traditional work environments, but to any work environment amenable to substitute fulfillment, information compilation or notification, such as an employee unit that works cooperatively together within a larger organization, for example, an emergency services unit.

BRIEF DESCRIPTION OF DRAWINGS

In the following, the invention will be described in greater detail by way of examples and with reference to the attached drawings, in which:

FIG. 3 is a diagram showing an exemplary data structure of a worker record stored in accordance with a preferred embodiment of the present invention;

FIG. 4 is a diagram showing an exemplary data structure of a client record stored in accordance with a preferred embodiment of the present invention;

FIG. 5 is a diagram showing an exemplary data structure of a list of pick-lists generated in accordance with a preferred embodiment of the present invention;

FIG. 6 is a diagram showing an exemplary data structure of a school record stored in accordance with a preferred embodiment of the present invention;

FIG. 7 is a diagram showing an exemplary data structure of a county record stored in accordance with a preferred embodiment of the present invention;

FIG. 8 is a diagram showing an exemplary data structure of a district record stored in accordance with a preferred embodiment of the present invention;

FIG. 9 is a diagram showing an exemplary data structure of a user-preferences record stored in accordance with a preferred embodiment of the present invention;

FIG. 10 is a diagram showing a list of available reports selectable by a user in accordance with a preferred embodiment of the present invention;

FIG. 11 is a diagram showing an exemplary data structure for initial registration with a substitute fulfillment system in accordance with a preferred embodiment of the present invention;

FIG. 12 is a representation of exemplary reports generated in accordance with a preferred embodiment of the present invention;

FIGS. 13A-13H are a state diagram illustrating the operation of a computer-implemented system for performing substitute fulfillment in accordance with a preferred embodiment of the present invention.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be limiting, but merely as a basis for the claims and as a representative basis for teaching one skilled in the art to variously employ the present invention.

Furthermore, element may be recited as being "coupled". Use of this terminology contemplates elements being connected together in such a way that there may be other components interstitially located between the specified elements, and that the elements so specified may be connected in fixed or movable relation to one another. Certain components may be described as being "adjacent" to one another. In such instances, it is expected that a relationship so characterized shall be interpreted to mean that the components are located proximate to one another, but not necessarily in contact with each other. Normally, there will be an absence of other components positioned there between, but this is not a requirement. Still further, some structural relationships or orientations may be designated with the word "substantially". In those cases, it is meant that the relationship or orientation is as described, with allowances for variations that do not effect the cooperation of the so described component or components.

Figure 1A:
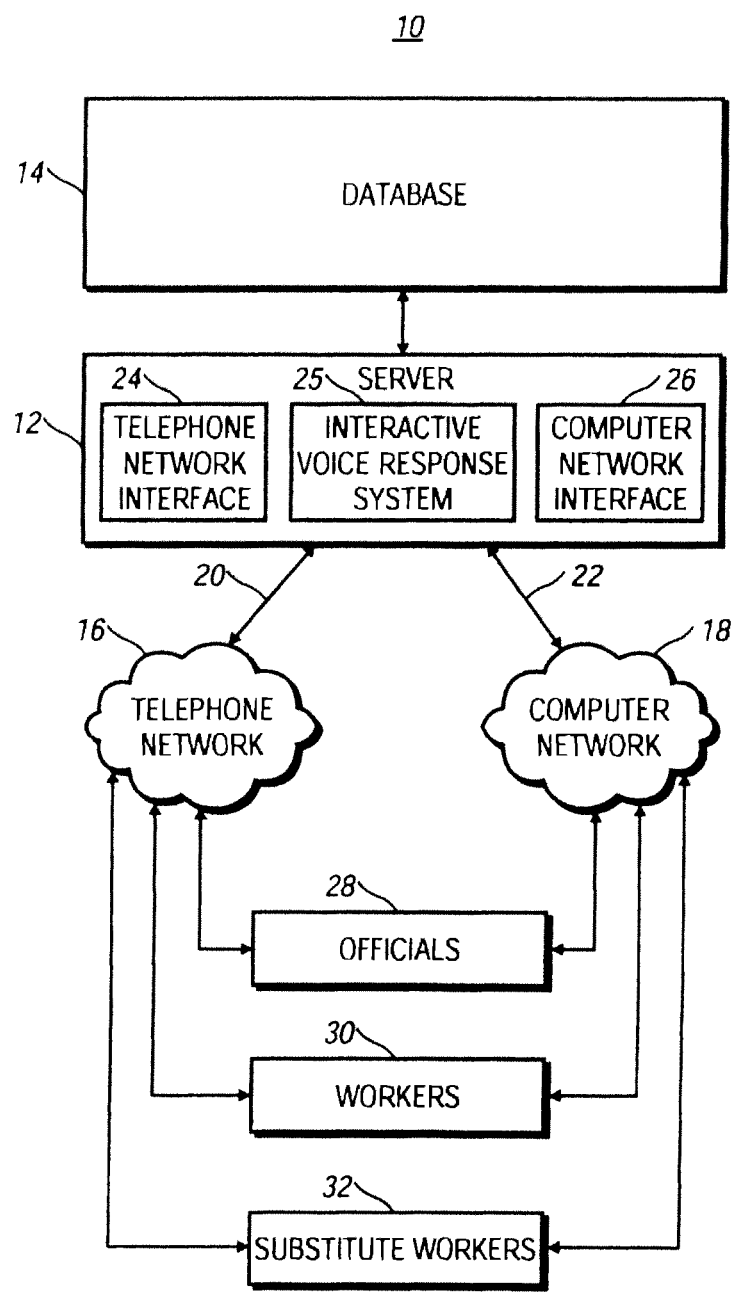
FIG. 1A is a block diagram of an exemplary substitute fulfillment system in accordance with a preferred embodiment of the present invention.

Referring to FIG. 1A, a block diagram of an exemplary substitute fulfillment system according to an embodiment of the present invention is illustrated. As illustrated, the substitute fulfillment system 10 includes a server 12 and a database 14. In a preferred embodiment, the server 12 comprises one or more servers. The server 12 manages the system 10, which can include, for example, managing the storage of data, maintaining the database 14, communication interfaces, user frontends, and processing substitute fulfillment, information compilation or notification events. In a preferred embodiment, the database 14 comprises one or more databases. The database 14 can contain data files with data records for one or more client organizations, worker data records for each registered worker in each client organization, and substitute worker data records for each substitute worker registered with the system 10.

In a preferred embodiment, the server 12 can communicate with one or more officials 28, one or more workers 30, and/or one or more substitute workers 32 via a telephone network 16 or a computer network 18. An official 28, a worker 30, or a substitute worker 32 communicates with the server 12 using an electronic device. The electronic device can be, but is not limited to, a telephone, a cellular telephone, a wireless telephone network, a smart telephone, a handheld, a pager, a computer, or any other electronic device which can receive and transmit information.

The server 12 is coupled to the telephone network 16 via one or more telephone communication links 20. The telephone network 16 can be, but is not limited to, a public telephone network, a cellular telephone network, a satellite telephone network, a pager network, or other types of telephone networks which can receive and transmit information. The server is coupled to the computer network 18 via one or more computer communication links 22. The computer network 18 can be, but is not limited to, the Internet, an Intranet, an instant messaging system, or any other type of computer network which can receive and transmit information.

In a preferred embodiment, the system 10 further comprises an Interactive Voice Response System (IVR) 25 for interfacing an official 28, worker, 30 and/or substitute worker 32 with the server 12. In a preferred embodiment, the IVR 25 resides on the server 12. Exemplary IVR systems 25 are the Dialogic Model.TM. D-41 ESC and D-240 product lines. In an alternate embodiment, the IVR system 25 can be outsourced to a Voice XML ASP provider with the server 12 containing code for IVR menus. In addition, the IVR system 25 can be used in conjunction with the telephone network 16 and/or the computer network 18, e.g., Voice Over Internet Protocol (commonly referred to as Voice over IP). The system 10 can generate call instructions over a computer network 18, e.g., the Internet to a gateway service (not shown) via one or more computer communication links 22. The gateway service translates the electronic calling instructions into a signal suitable for delivery to an end-user via a telephone. The end-user listens to the audible prompts and responds using the telephone which sends one or more signals back to the gateway, which in turn transmits the signal to the system 10 via the one or more computer communication links 22.

In a preferred embodiment, the system 10 further comprises a telephone network interface 24 and a computer network interface 26. The network interfaces 24, 26 allow an official 28, worker 30 and/or substitute worker 32 to interface with the server 12 via the telephone network 16 and/or the computer network 18 In a preferred embodiment, the network interfaces 24, 26 reside on the server 12. The network interface 24, 26 can be, but are not limited to, an IVR interface, a website interface, an instant messaging interface, a wireless application protocol interface, an Imode interface, a pager interface, a handheld interface, or any other type of network interface 24, 26 which can receive and transmit information over one or more telecommunication links 20, 22.

Figure 1B:
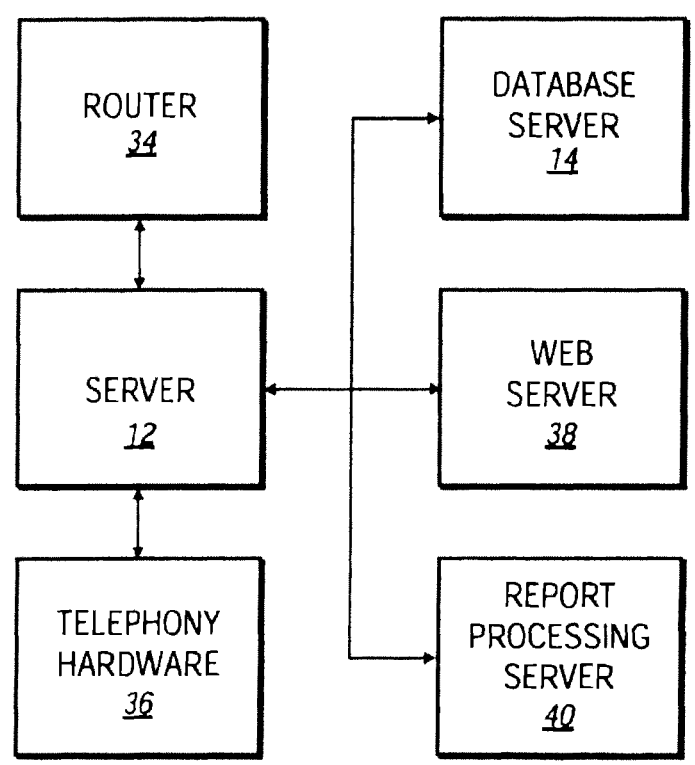
FIG. 1B is a detailed block diagram of an exemplary server configuration in accordance with a preferred embodiment of the present invention.

Referring to FIG. 1B, a detailed block diagram of an exemplary server configuration in accordance with a preferred embodiment of the present invention is illustrated. The substitute fulfillment system 10 comprises one or more servers. The database server 14, or database engine, contains the database, which can reside on one or more computers. In a preferred embodiment, the database server 14 is an Microsoft SQL.TM. server. The database can also be ported and run on an Oracle database. The web server 38 contains webpages for one or more websites accessible from the Internet via the website interface 26. The report processing server 40 is configured to gather data and/or generate one or more reports for client organizations. In alternate embodiments, each server can run on a separate computer or on the same computer as any of the other servers. The server 12 can be coupled to telephony hardware 36. In a preferred embodiment, the telephony hardware 36 includes multiple phone lines having one or more telephone communication links 20 that are coupled to the telephone network 16. In a preferred embodiment, the central server 12 is further coupled to one or more routers 34 that are coupled to one or more network communication links 22 that are coupled to the Internet 18. In a preferred embodiment, the present invention is an Internet Application Server Provider (ASP), or a thin-client.

Figure 1C:
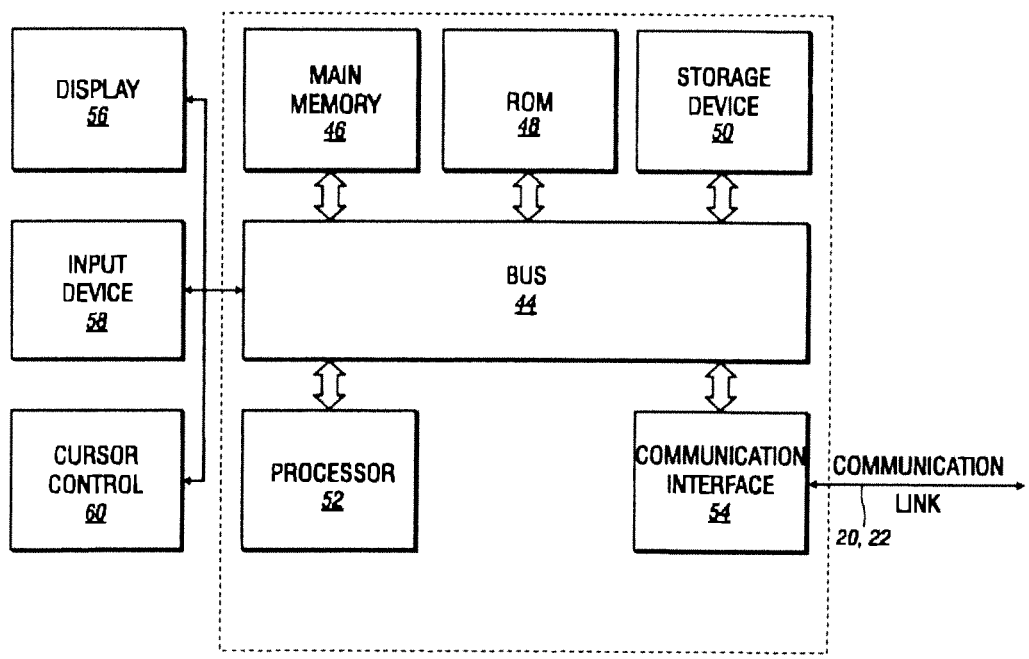
FIG. 1C is a block diagram of an exemplary server in accordance with a preferred embodiment of the present invention.

Referring to FIG. 1C, a block diagram of an exemplary server in accordance with a preferred embodiment of the present invention is illustrated. According to a preferred embodiment, the substitute fulfillment system 10 operates on a server 12 by executing one or more sequences of one or more instructions contained in the main memory 46. Such instructions may be read into main memory 46 from another computer readable medium, such as a storage device 50. Execution of the sequences of instructions contained in main memory 46 causes processor 52 to perform the process steps described herein. One or more processors 52 in a multi-processing arrangement may also be employed to execute the sequences of instructions contained in main memory 46. In alternative embodiments, hard-wired circuitry may be used in place of or in combination with software instructions to implement the invention. Thus, embodiments of the invention are not limited to any specific combination of hardware circuitry and software.

The server 12 can be coupled via the bus 44 to a display 56, such as a cathode ray tube (CRT), for displaying information. An input device 58, including alphanumeric and other keys, is coupled to the bus 44 for communicating information and command selections to processor 52. Another type of user input device is a cursor control 60, such as a mouse, a trackball, or cursor direction keys for communicating direction information and command selections to processor 52 and for controlling cursor movement on the display 56. This input device typically has two degrees of freedom in two axes, a first axis (e.g., x) and a second axis (e.g., y), that allows the device to specify positions in a plane.

The term "computer-readable medium" as used herein refers to any medium that participates in providing instructions to processor 52 for execution. Such a medium may take many forms, including but not limited to, non-volatile media, volatile media, and transmission media. Non-volatile media include, for example, optical or magnetic disks. Volatile media include dynamic memory, such as main memory 46. Transmission media include coaxial cables, copper wire and fiber optics, including conductors that comprise a bus 44. Transmission media can also take the form of acoustic or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium, with patterns of holes, a RAM, a PROM (programmable ROM), and EPROM (electronically PROM) a FLASH-EPROM, any other memory chip or cartridge, a carrier wave, or any other medium from which a computer can read.

Various forms of computer-readable media may be involved in carrying one or more sequences of one or more instructions to processor for execution. For example, the instructions may initially be borne on a magnetic disk of a remote computer. The remote computer can load instructions into its dynamic memory and send the instructions over a telephone line using a modem. A modem local to computer system can receive the data on the telephone line and use an infrared transmitter to convert the data to an infrared signal. An infrared detector coupled to the bus 44 can receive the data carried in the infrared signal and place the data on the bus 44. Bus 44 carries the data to main memory 46, from which processor 52 retrieves and executes the instructions. The instructions received by main memory 46 may optionally be stored on storage device 50 either before or after execution by processor.

Computer system also includes a communication interface 54 coupled to bus 44. The communication interface 54 provides a two-way data communication coupling to a communication link 20, 22. The communication interface 54 provides an interface between the IVR system 25 and the website interface 26 and the communication links 20, 22, respectively. For example, the communication interface 54 may be an integrated services digital network (ISDN) card or modem to provide a data communication connection to a corresponding type of telephone line. As another example, communication interface 54 may be a local area network (LAN) card to provide a data communication connection to a compatible LAN. Wireless links may also be implemented. In any such implementation, communication interface 54 sends and receives electrical, radio frequency, or optical signals that carry digital streams representing various types of information.

The server 12 can send messages and receive data, including program code, through the network(s), communication link 20, 22 and communication interface 54. In the Internet example, the server 12 can transmit a requested code for an application program through the communication interface 54 and Internet 18.

Registering with the System

Client organizations must register with the substitute fulfillment system 10 in order for the system 10 to secure a substitute worker for an absent worker. The registration process requires a client organization to provide the registration information necessary to perform substitute fulfillment. In a preferred embodiment, the client organization provides this registration information in a spreadsheet. The spreadsheet can be sent via email or placed on a computer medium and sent in the mail. A worker then enters the registration information into the database 14 for the client organization.

In an alternate embodiment, a client organization uses an applet, e.g., a registration "wizard," to enter the registration information. The wizard presents a series of interfaces for guiding the organization through the registration process. Referring now to FIG. 11, preferably, the registration wizard interface 250 requires the organization to submit identification 260 and billing information 258.

In a preferred embodiment, the server 12 displays one or more webpages that provide a client organization a series of forms to complete in order to build records, which are key to substitute identification for each worker 30 or potential substitute 32, as well as other records necessary for ancillary tasks. Examples of other records include general customer information and reporting preferences. The webpages are preferably tailored for collecting data needed to perform substitute fulfillment in the work environment of the organization. For example, if the customer is a school, the webpages can be tailored to collect data related to teachers, such as education background, certifications, schedules, and course information. The forms preferably conform to the data records that will be maintained by the server 12 in the database 14. The webpages may aid the client in completing particular fields in the forms by providing drop-down lists with options for that field.

Referring to FIG. 5, a sample data structure 150 of a possible Pick-Lists that can be generated is illustrated. For example, the drop-down list may provide a list of all courses taught at the school so that the client can select the classes taught by a particular teacher to fill in that teacher's record. The server 12 can also automatically fill in certain fields for the client by drawing on information stored in other records. For example, referring to FIGS. 3 and 6, once a school has completed a school data record 166, the server 12 can fill in the school contact information 176, 178, and 180 for each teacher affiliated with a particular school. Once the information has been entered into the system 10, the information can subsequently be updated using the webpages via website interface 26.

In another embodiment, the primary data elements of the system 10 such as a worker, substitute worker and location data, can be electronically transmitted between a client's existing system and the system 10, thereby eliminating the need for manual data entry. The electronic exchange of such data elements can be bi-directional, e.g., as soon as a specific worker's record is modified on the client's system, the data can be propagated from the client's system to the system 10, and vice versa where as soon as the worker records is modified in the system 10, the modified data can be electronically transmitted to the client's system.

Typical Data Records in the System

Referring to FIGS. 3-10, exemplary data records for a school district client according to an embodiment of the present invention are illustrated. The data records illustrate types of information that the system 10 typically uses, and how that information would typically be organized. In a preferred embodiment, the information in the data records is provided to the system 10 through the website interface.

Referring to FIG. 3, an exemplary staff data record according to an embodiment of the present invention is illustrated. As shown, teacher and substitute information stored in a staff data record 90, or data record 404, can include: name 92; title 94; social security number 96; a personal identification number (PIN) 98; billing information for billing substitute fulfillment services involving that teacher 100; certifications of the teacher 102; a list of teachers preferred to substitute for the teacher, or, alternatively, a list of criteria for selecting an appropriate substitute for the teacher 104; schedule information, preferably through a pop-up calendar 106, including work duties and absence information 108 (primarily for teachers) and availability 126 (primarily for substitutes); flags for special conditions 122, such as special instructions for a substitute or messages from a teacher to a substitute; affiliation information 112; contact information for the teacher 116; organization contact information for who to contact if that teacher calls in an absence or a substitute fulfillment is performed 118; classroom location information 120; entitlement balances 124, for how many absences (sick days, personal days, etc.) a teacher has left for the school year; and call time preferences 128 (primarily for substitutes). The substitute schedule information is also stored in data record 403. The entitlement types are stored in data record 402.

Referring to FIG. 4, exemplary business data for record-keeping, billing, and administrative functions according to an embodiment of the present invention is illustrated. The database 14 can store a business data record 130 with fields such as: the billing address 132 of the customer organization, its mailing address 134, billing contact 136, emergency contacts 138, phone numbers 140, fax numbers 142, electronic mail addresses 144, and options selected 148. It is understood that the fields shown are only representative of the fields that may be used within the scope of the present invention. Also, these fields may be further broken down into more specific subfields, for example, multiple mailing addresses or different emergency contacts for different times of day, week, month, or year. In this way, the system 10 maintains the information needed to perform substitute fulfillment, information compilation or notification for a particular organization. Other possible records are shown in FIGS. 5-10, and include records for pick-list management 150; for school data 166; for county data 190; for district data 202; for client preferences 226; and for reporting schemes 230. The skills for each worker that may be used as a substitute or may require a substitute are recorded in data record 409, while the worker's personal identification number for accessing the system 10 is stored in data record 410. Data records 407 and 408 include the preferred skills of a potential substitute and the skills of the actual substitute who accepts the position, respectively. The records maintained in the main database of the system 10 are preferably stored on the database server 14.

Substitute Worker Fulfillment

Figure 2A:
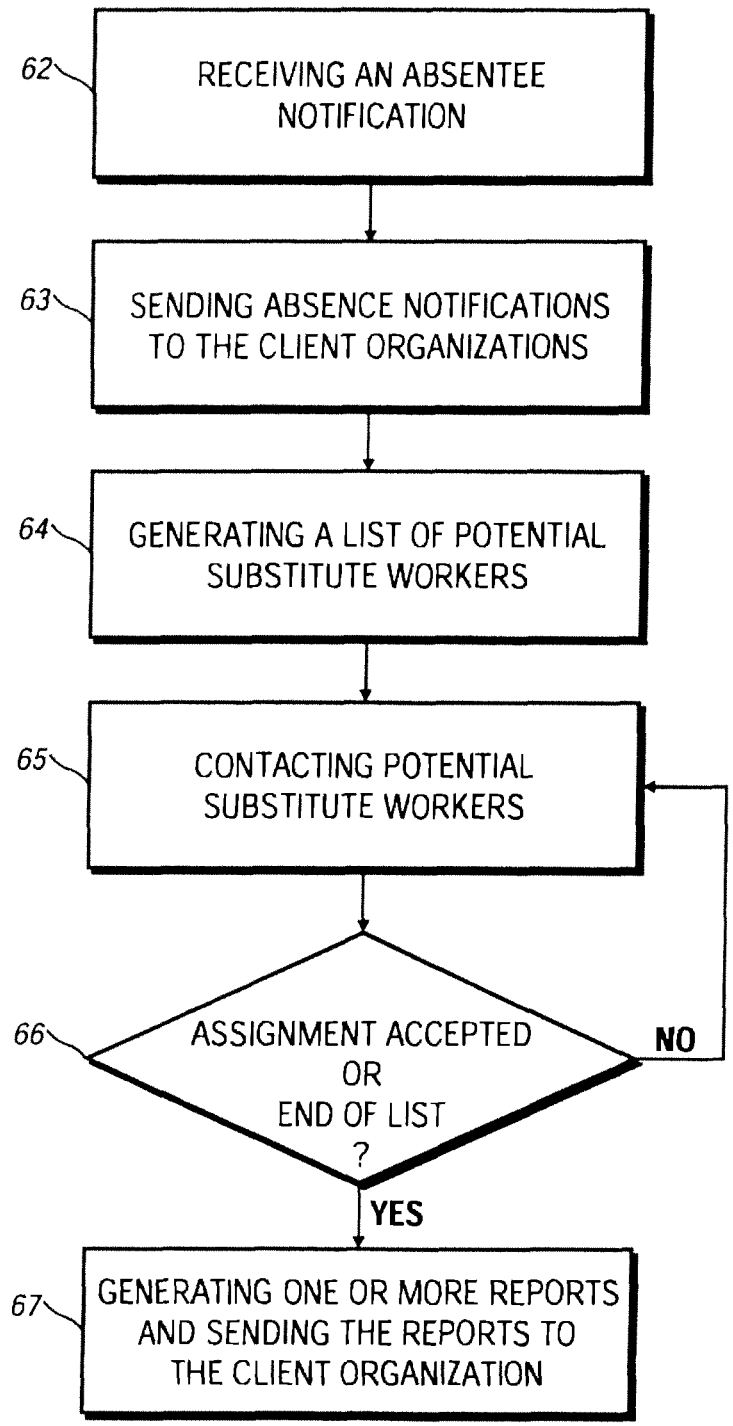
FIG. 2A is an exemplary flowchart of a method for performing substitute fulfillment according to an embodiment of the present invention.

Referring to FIG. 2A, an exemplary flowchart of a method for performing substitute fulfillment according to an embodiment of the present invention is illustrated. At step 62, the server 12 receives notification of an absentee. The notification can occur in several ways. In one embodiment, when a worker 30 covered by the system 10 becomes aware of an absence, the worker 30 contacts the server 12 by telephone, preferably through a toll-free number. Using keys on the standard telephone keypad, the worker 30 identifies himself or herself and enters the details of the pending absence. Alternatively, the worker 30 can contact a website hosted by the server 12 via the Internet 18. In an alternate embodiment, the worker 30 can access a website hosted by the server 12 via a link on a website hosted on behalf of the worker's employer. The worker 30 can access the website using a personal computer, an Internet capable telephone, a personal data assistant, or any other device that provides access to the Internet. The information regarding the pending absence is stored in data record 401. In addition to providing information regarding his upcoming absence, the worker 30 can also record or transmit a message directed to the substitute worker or substitute 32. In one embodiment, if the worker 30 notifies the client organization, rather than the system 10, of the absence directly, then the organization can either call in the absence as described above or can access the website as described above.

Once the server 12 receives the notification of an absence, the server 12 records the absence in data record 401. The skills required of a substitute are stored in data record 405. The entitlement information regarding a pending absence is stored in data record 406. The server operates in the states shown in FIGS. 13A-13B, including Initial (281), MainMenu (282), Whenstep1 (283), WhenAnotherDay (284), Shift (285), StartTime (286), AbsenceType (287), RecordInstructions (288), ConfirmAbsence (289), CheckComplete (290), Entitlements (291), ErrorState (292), Hangup (293), and Goodbye (294), and the events which invoke these states are also described in FIGS. 13A-13B. For example, Generate Start Event signifies returning to the first action of the phone call, preferably to replay a greeting or a request for an identification number. MainMenu (282) prompts the worker to push 1 on the telephone if the worker desires to record an absence, 2 to listen to entitlement day balances, including but not limited to vacation, personal and sick days remaining, and 3 for special instructions regarding a particular workplace. In Shift (285), if the worker's absence will not begin at the start of the work shift, the system proceeds to StartTime (286), during which worker is prompted for the start time of the absence. The worker is prompted to designate an absence type, which types have been designated by the Client, in state 287. In Entitlements (291), "List Entitlement Day Balances" signifies notifying the worker of entitlements, including but not limited to, used and remaining vacation, sick and personal days.

At step 63, the system 10 distributes absence notifications to relevant client personnel 28. The absence notifications can be distributed on a regular basis at a time specified in advance by the client or on an event basis, e.g., upon each notification. Referring to FIG. 12, an exemplary notification in the form of summary absence reports 276 is illustrated. The information for the absence reports is stored on data record 400. For example, the server 12 can transmit a summary absence report 276 for each workday at 5:00 p.m. on the previous day and again at 7:00 a.m. that day to selected client personnel. The summary absence reports 276 can be distributed via facsimile, electronic mail, applet, or through the website to any parties designated by the client as "need-to-know" parties for all absences or for particular absences. Notification preferences are stored within the server 12. In a preferred embodiment, designated client personnel receive both an absence notification via electronic mail as soon as the absence is registered and a summary absence report 276 via facsimile at a pre-set time. Use of multiple communications channels builds additional reliability into the system 10.

At step 64, the substitute fulfillment system 10 identifies potential substitutes 32 for the absent worker 30. The organization typically has a pool of potential substitutes 32. If the organization has chosen to identify particular substitutes 32 suitable for a particular worker 30, then the substitute fulfillment system 10 accesses a list of the identified substitutes 32 which is used in the next step. Alternatively, if the organization has identified only qualifications or criteria for selecting an acceptable substitute 32 for a particular worker 30, then the substitute fulfillment system 10 compiles a list of potential substitutes by searching for potential substitutes with the requisite qualifications in a master list of substitutes 32 available to the organization located in the database 14. In a preferred embodiment, the substitute fulfillment system 10 compiles a list of preferred substitutes and a back-up list of acceptable substitutes.

At step 65, the system 10 contacts potential substitutes 32 via the telephone network using the IVR system 24. The IVR system 24 interfaces logically with callers, usually employing a set of pre-recorded prompts, a database, and dynamic selection criteria. The number called, and the caller identification are recorded in data record 411. The server operates during step 82 in the states including MakeTheCall (308), CallAnalysis (309), Identify (310), PresentRequest (311), RejectRequest (312), AcceptRequest (313), ErrorState (314), Goodbye (315), and Hangup (316) which are displayed in FIG. 13E. The invoking events for each of these states are set forth in FIG. 13E, and examples of these events follow:

In Identify (310), the potential substitute is prompted for an identification number. In PresentRequest (311), the request is played and the potential substitute is prompted for 1 to replay the request, 2 to accept and 3 to reject. Further, the potential substitute is prompted for 1 to reject future requests, or 2 to allow additional requests to be phoned to the potential substitute, in RejectRequest (312). If the potential substitute accepts the request, a confirmation number is played in AcceptRequest (313).

At step 66, the system 10 continues to contact the potential substitute workers listed on the generated list over a period of time until a substitute worker 32 accepts a position or until the generated list is exhausted. If multiple lists of potential substitutes have been compiled, the system 10 first searches the list of preferred substitutes before resorting to secondary lists. The client organization may specify appropriate call times and other parameters for the IVR system 24. If a substitute worker 32 accepts the assignment, the server 12 can relay instructions from the organization or messages from the absent worker 30 to the substitute worker 32.

At step 67, the system 10 generates one or more reports and send the reports to organization personnel 28, e.g., officials, designated for receipt of the reports. Clients may specify different personnel distribution lists for various reports. Reports may be mailed electronically or faxed, or both by server 12. Referring to FIG. 12, exemplary reports generated by the system according to an embodiment of the present invention. The system 10 generates summary absentee reports 276, summary substitute assignment reports 278, call history reports 279, and unfulfilled substitute assignment reports 280 with the details of any successful substitute, all calls made, and information regarding any vacancy that could not be filled. The information for the reports is stored in data record 400.

In a preferred embodiment of the present invention, all desired transaction information, including all absence notifications, substitute requirements, substitute fulfillment attempts, substitute fulfillment successes and failures, web site accesses, employment searches by substitutes, etc., are stored in the database 14.

List of Opportunities for Substitute Workers

In a preferred embodiment, using the information in the database 14, the server 12 can generate a listing of opportunities for substitute workers 32 and make the listing available through a web site interface. Substitute workers 32 can access the site and select an assignment. If the same assignment is currently being processed or waiting to be processed by the IVR system 24, then the assignment selection is recognized, further processing is halted, and appropriate reports generated. Data record 400 stores the information for said reports.

Figure 2B:
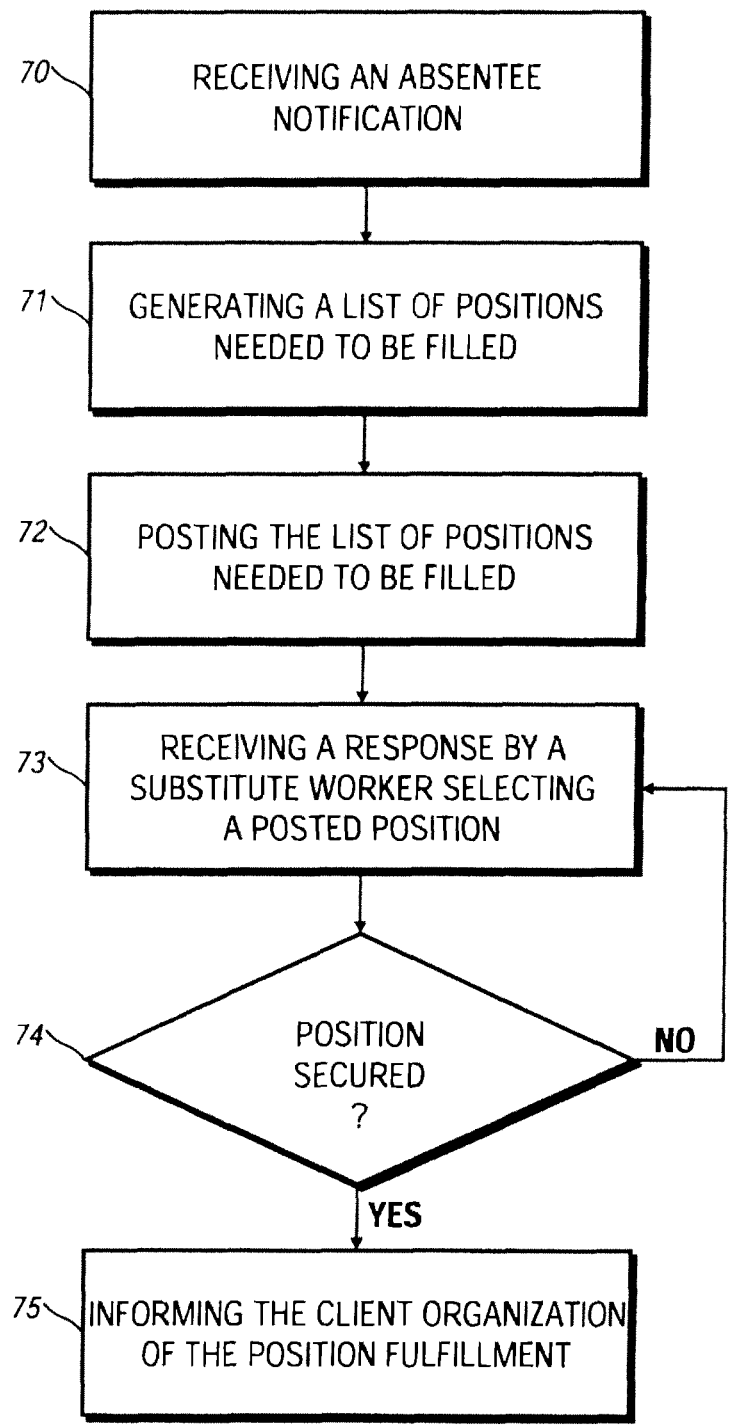
FIG. 2B is an exemplary flowchart for allowing a substitute worker to secure a position via the Internet according an embodiment of the present invention.

Referring to FIG. 2B, an exemplary flowchart for allowing substitute workers to secure a position via the Internet is illustrated. At step 70, the server 12 receives notification of an absentee. Step 70 is equivalent to step 62 in FIG. 2A.

At step 71, the system 10 generates a list of positions that need to be filled. The list can be generated on a periodic basis, e.g., at the same time everyday, or on an event basis, e.g. adding a new position upon the receipt of an absentee notification. In the preferred embodiment, positions that the organization has chosen to identify particular substitutes 32 suitable for a particular worker 30, then the position is not listed unless the system 10 cannot secure an identified substitute 32.

At step 72, the system 10 posts or displays the list on a website hosted on the server 12.

At step 73, a response to the posted position is received by the system 10 via the Internet.

At step 74, the system 10 determines if the substitute worker 32 is qualified to fill-in for the absent worker 30. The determination is made by comparing the qualifications of the potential substitute worker 32 with the qualifications or criteria for the position that are identified by the client organization. If the system 10 determines that the potential substitute worker 32 is qualified, then the system 10 secures the substitute worker 32 to cover for the absent worker 30. If a substitute worker 32 accepts the assignment, the server 12 can relay instructions from the organization or messages from the absent worker 30 to the substitute worker 32.

At step 75, the system 10 notifies the client organization of the position fulfillment. This can be accomplished by generating one or more reports and sending the reports to organization personnel 28, e.g., officials, designated for receipt of the reports. Client organizations can specify different personnel distribution lists for various reports. Reports may be mailed electronically, faxed, or both by server 12. Referring to FIG. 12, exemplary reports generated by the system according to an embodiment of the present invention. The system 10 generates summary absentee reports 276, summary substitute assignment reports 278, call history reports 279, and unfulfilled substitute assignment reports 280 with the details of any successful substitute, all calls made, and information regarding any vacancy that could not be filled. The information for the reports is stored in data record 400.

The server 12 is capable of handling multiple clients and multiple substitute fulfillment tasks simultaneously. The system 10 provides opportunities to match substitutes across organizations, to aggregate data and to review trends. In a preferred embodiment, the server 12 and database 14 track substitute fulfillment data globally, identify opportunities for inter-organization substitute referral or fulfillment, and report on substitute fulfillment needs and other trends. The report information is stored in data record 400. For example, the server 12 may identify substitute teachers registered in a district adjacent to a customer school district and inform the customer school district. In another example, the substitute fulfillment system may identify hot spots where substitutes with particular qualifications are in demand.

Notification System of an Unexpected Absence

In a preferred embodiment, the system 10 can notify designated groups of people of an absence over the telephone. The client in this embodiment is an organization including but not limited to school or business entity. The data records may contain information related to contact information for each student in the school's body or each worker, including but not limited to, phone numbers and email addresses of parents" and guardian's, student's classes, and student's year.

Figure 2C:
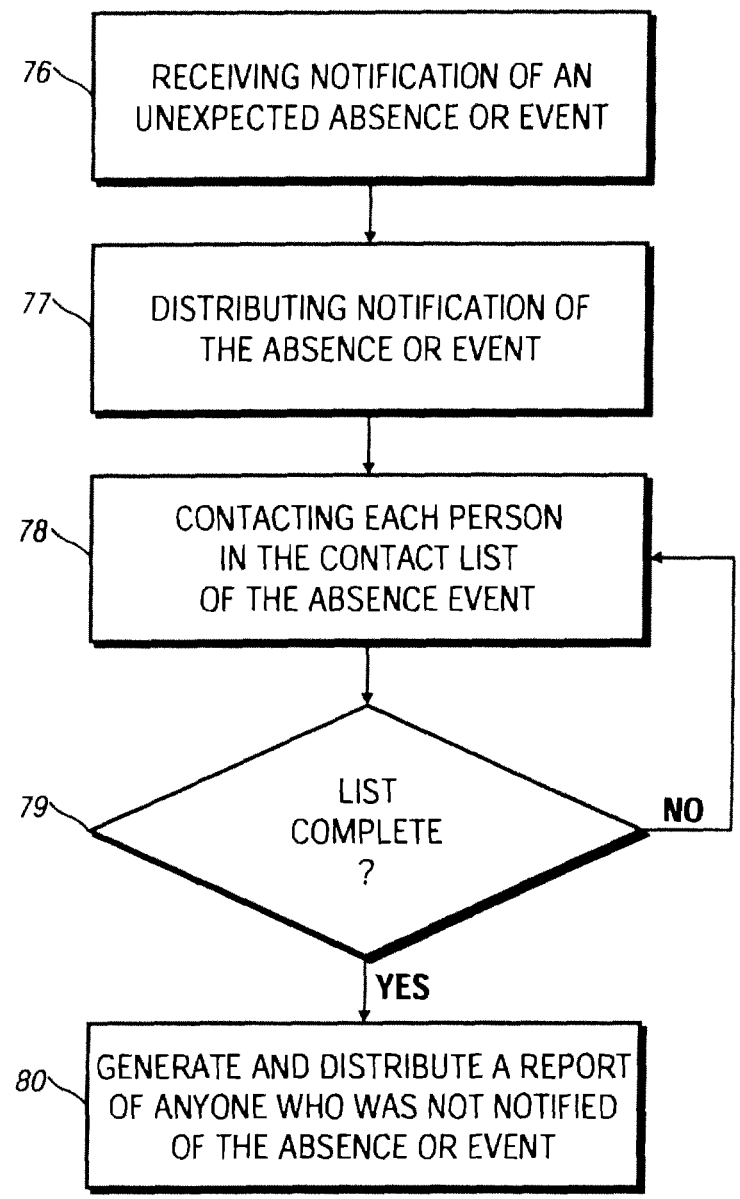
FIG. 2C is an exemplary flowchart for notifying a designated group of an unexpected absence or event according to an embodiment of the present invention.

Referring to FIG. 2C, an exemplary flowchart for notifying a designated group of an unexpected absence according to an embodiment of the present invention is illustrated. At step 76, the system receives a notification of an unexpected absence via a phone call or email. Information regarding the call, including the number called is stored at data record 411. At step 76, the server 12 transitions between the states shown in FIG. 13D, which included RecordFilesMenu (303), RecordFiles (304), ErrorState (305), Goodbye (306) and Hangup (307). These states are invoked by the events set fourth in FIG. 13D and several example events follow. The caller is prompted for the recording ID, in order to prevent an unauthorized recording in RecordFilesMenu (303). In RecordFiles (304), if the caller presses 1 on the telephone, the system 10 prompts the caller to record a new recording or to verify that the existing recording is acceptable.

At step 77, the system 10 distributes notifications of absence to interested parties, including but not limited to, administrators or managers. These notifications may be in the form of summary absence reports distributed by facsimile, electronic mail, or via telephone to any parties designated by the client as a contact person for all absences or for particular absences, including absences for a particular class year.

At step 78, the system 10 contacts each persons listed in the contact information ("contacts") for each absent student or worker, including but not limited to parents and guardians, preferably via the IVR system 25 and telephone network 16. The system 10 calls the contacts in order to receive an acknowledgement that the student or worker is absent for an acceptable reason.

At step 79, the system 10 continues to call particular contacts for the student or worker until the list is exhausted. If the list is not exhausted, the system 10 continues to call the next contact on the list.

At step 80, the system 10 generates and distributes a report of unacknowledged absences from the server to designated personnel in the client organization.

Notification System of an Unexpected Event

In another preferred embodiment, the invention may be used to notify designated groups of people over the telephone of an unexpected event. The client in this embodiment includes but is not limited to a school, school district, or business entity. The data records, in a preferred embodiment, contain information related to contact information for each student or worker of the client's, including but not limited to, phone numbers for workers, parents, and guardians, email addresses, student's classes, student's grade, and the content of the message representing the unexpected event.

Referring to FIG. 2C again, an exemplary flowchart for notifying a designated group of an unexpected event according to an embodiment of the present invention is illustrated. At step 76, the system 10 receives a phone call or email regarding an unexpected event or announcement of the client, and records a new message regarding the unexpected event or announcement. The server 12 then operates in and transitions between the states shown in FIG. 13C, which include MainMenu (295), RecordSchoolMenu (296), RecordSchool (297), Record EntTypesMenu (298), RecordEntTypes (299), ErrorState (300), Goodbye (301), and Hangup (302). The events which invoke and transition between these states are shown in FIG. 13C.

At step 78, the server 12 then contacts the persons listed in the contact information for each affected student or worker, including but not limited to parents and guardians, preferably using the IVR system 25 and telephone network 16 to notify the contacts of the event or announcement. At step 79, the system 10 continues to call particular contacts for the student or worker until the list is exhausted. If the list is not exhausted, the system 10 continues to call the next contact on the list. At step 80, the system 10 generates and distributes a report of unacknowledged event announcements from the server to designated personnel in the client organization. The report can be distributed via facsimile, electronic mail, or via an applet to any parties designated by the client as a contact person for all events or for particular events. All information for the reports is stored in data record 400.

Figure 2D:
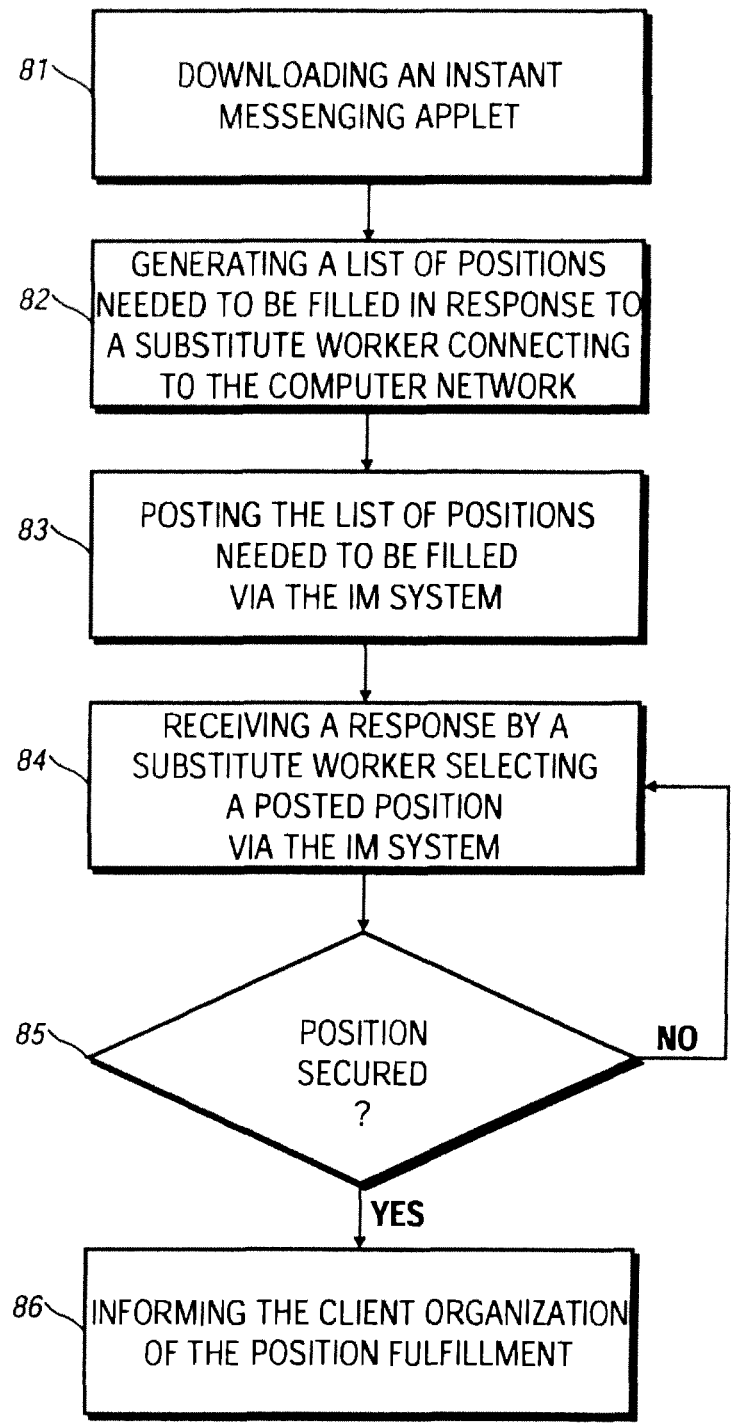
FIG. 2D is an exemplary flowchart for allowing a substitute worker to secure a position via an instant messaging system according to an embodiment of the present invention.
Figure 14A:
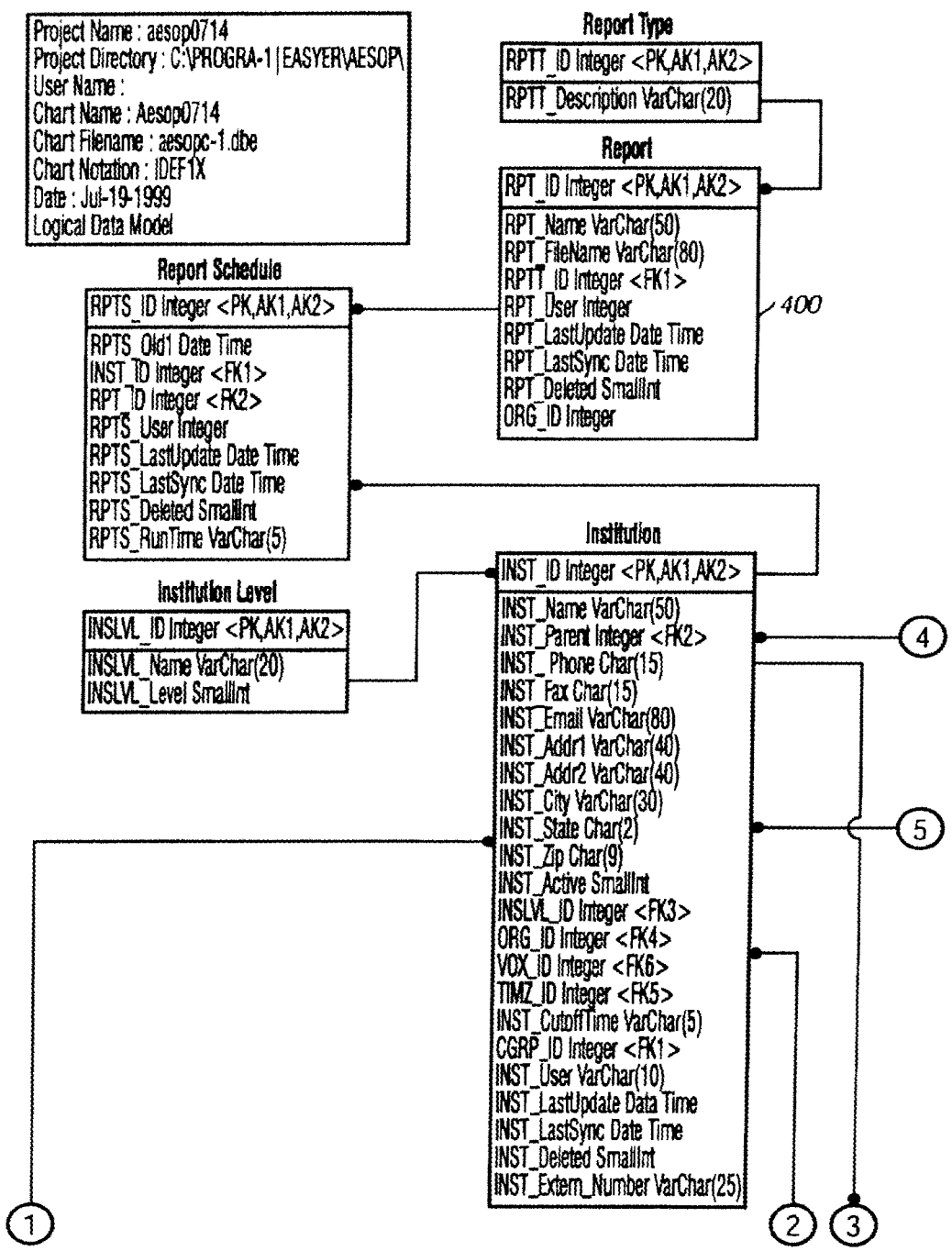
FIGS. 14A-14J depicts a block diagram illustrating a data structure used for storing information in accordance with a preferred embodiment of the present invention.
Figure 14B:
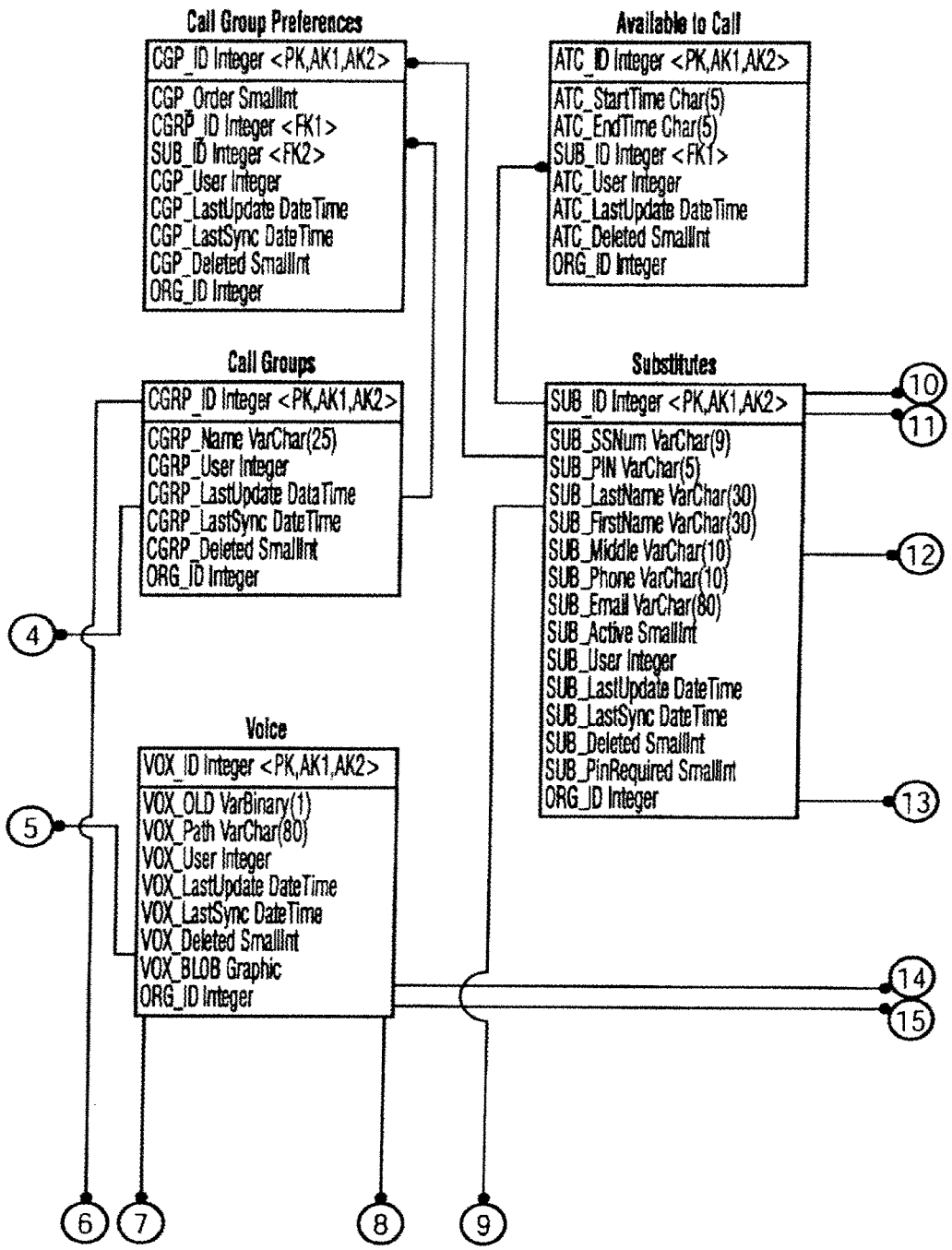
Figure 14C:
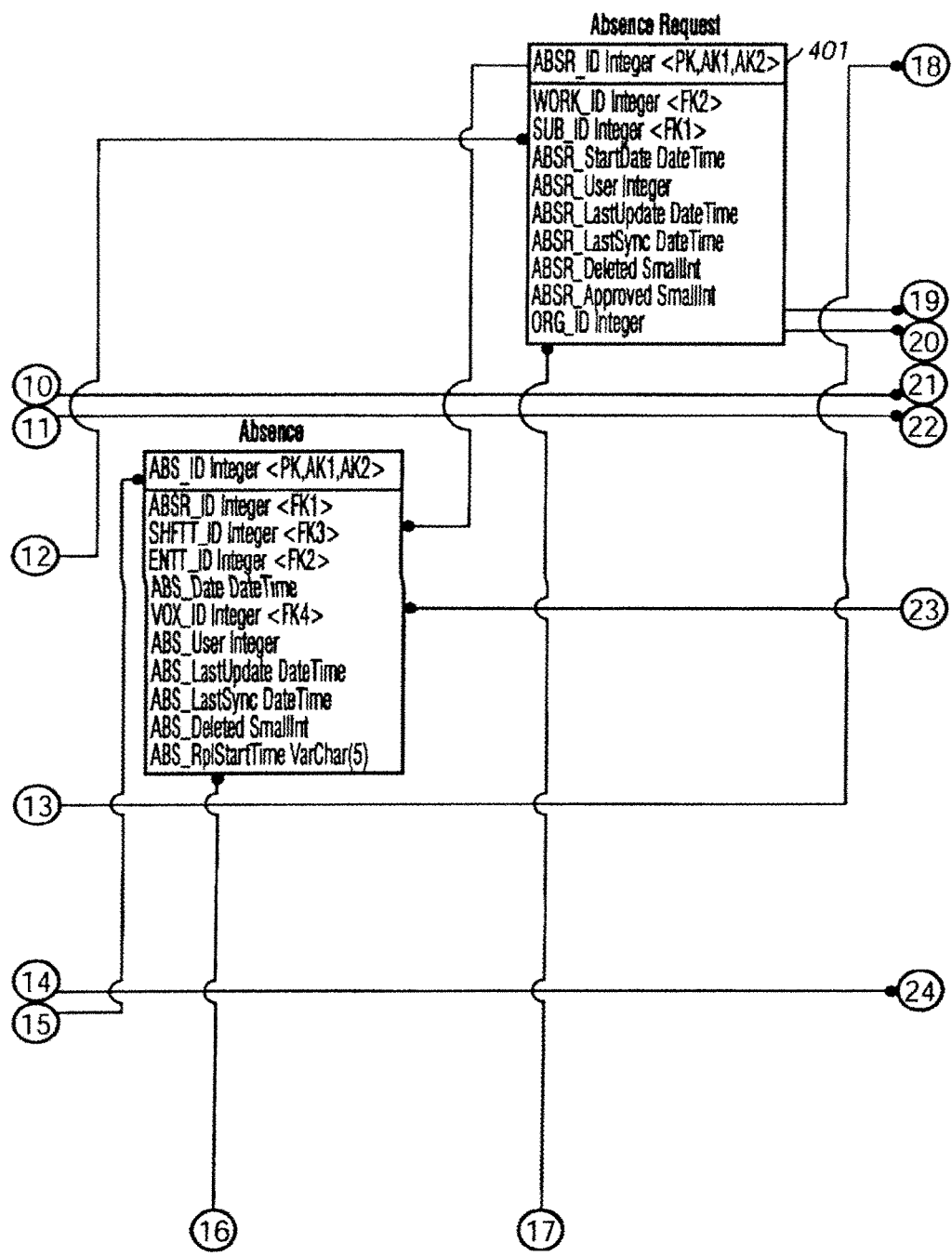
Figure 14D:
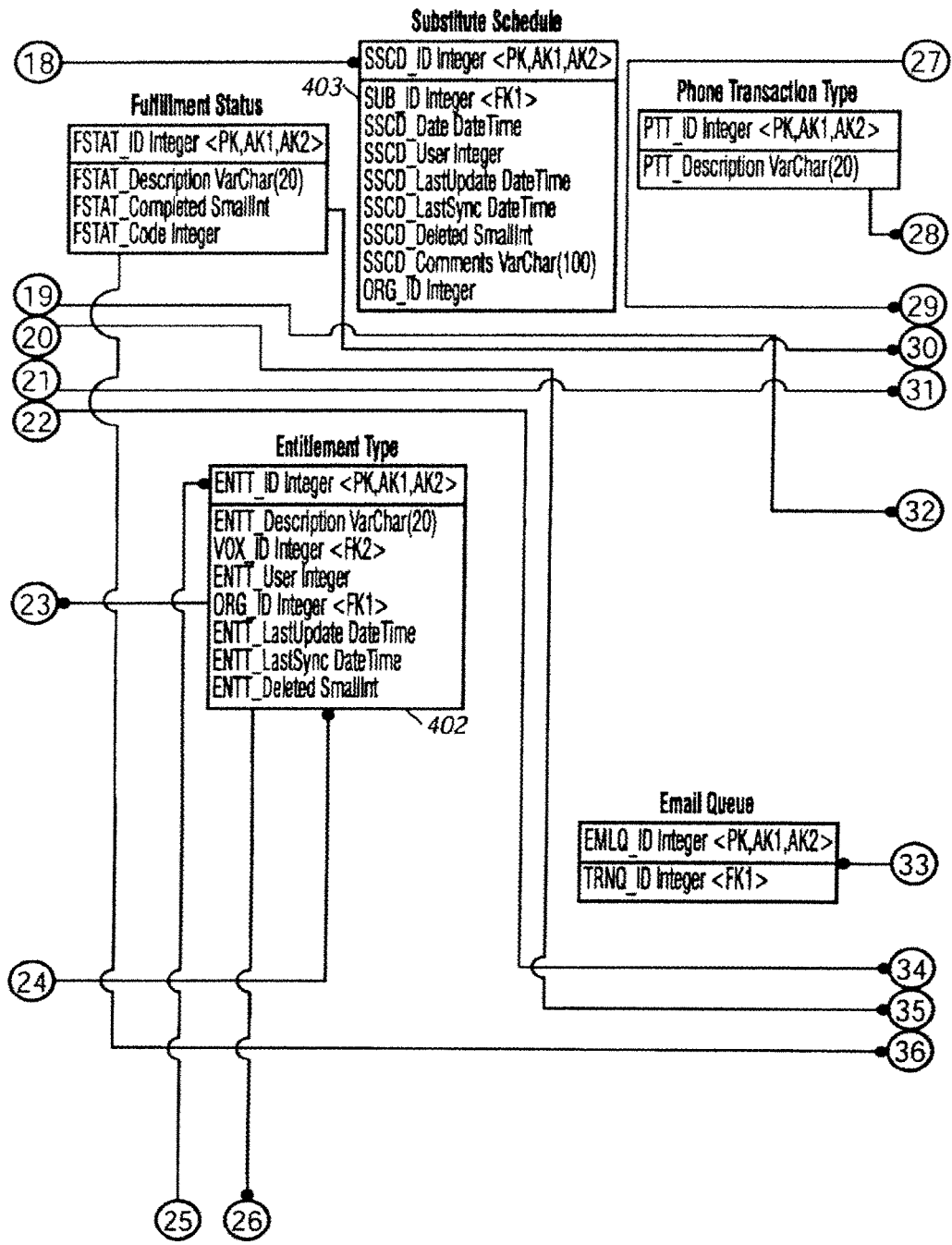
Figure 14E:
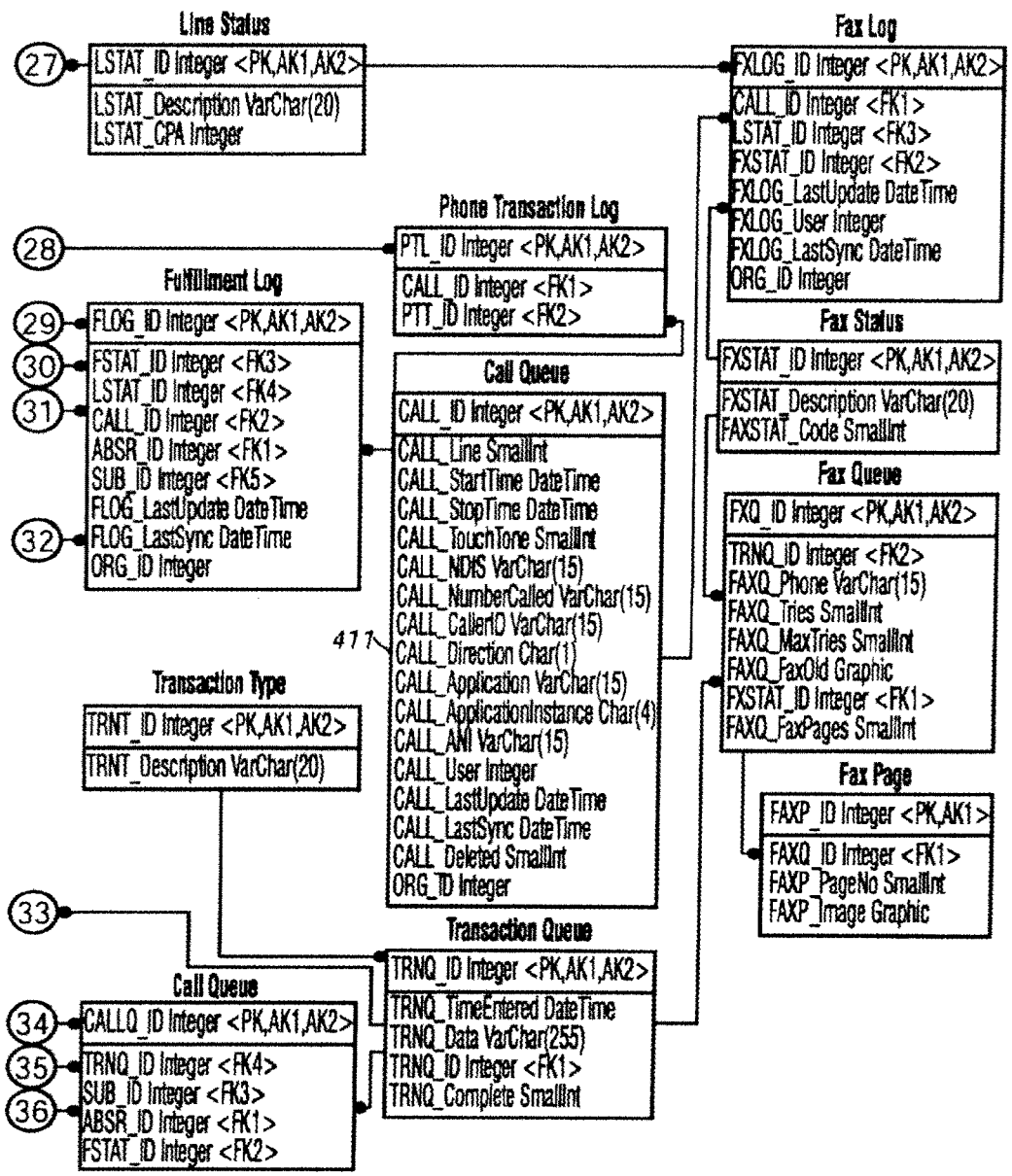
Figure 14F:
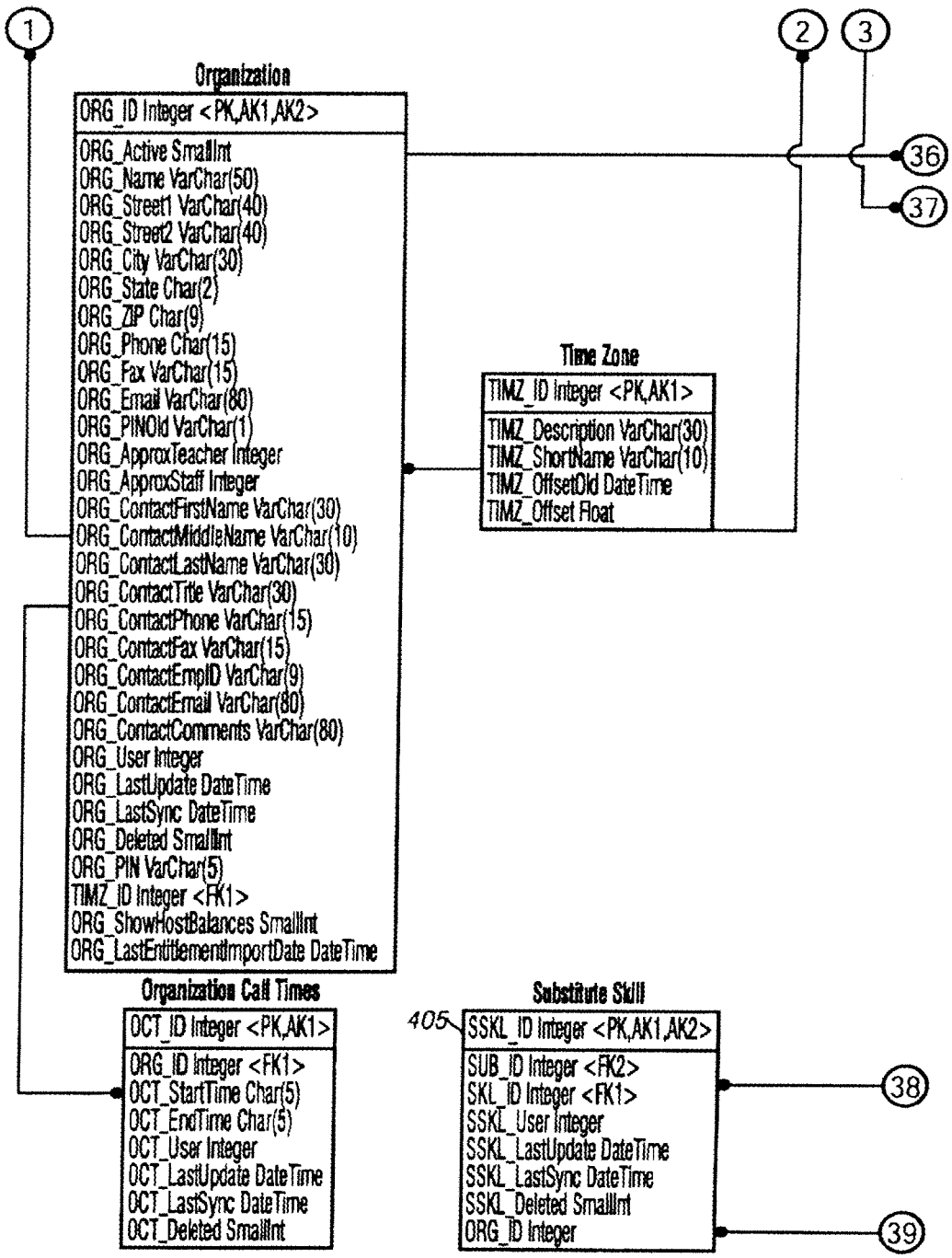
Figure 14G:
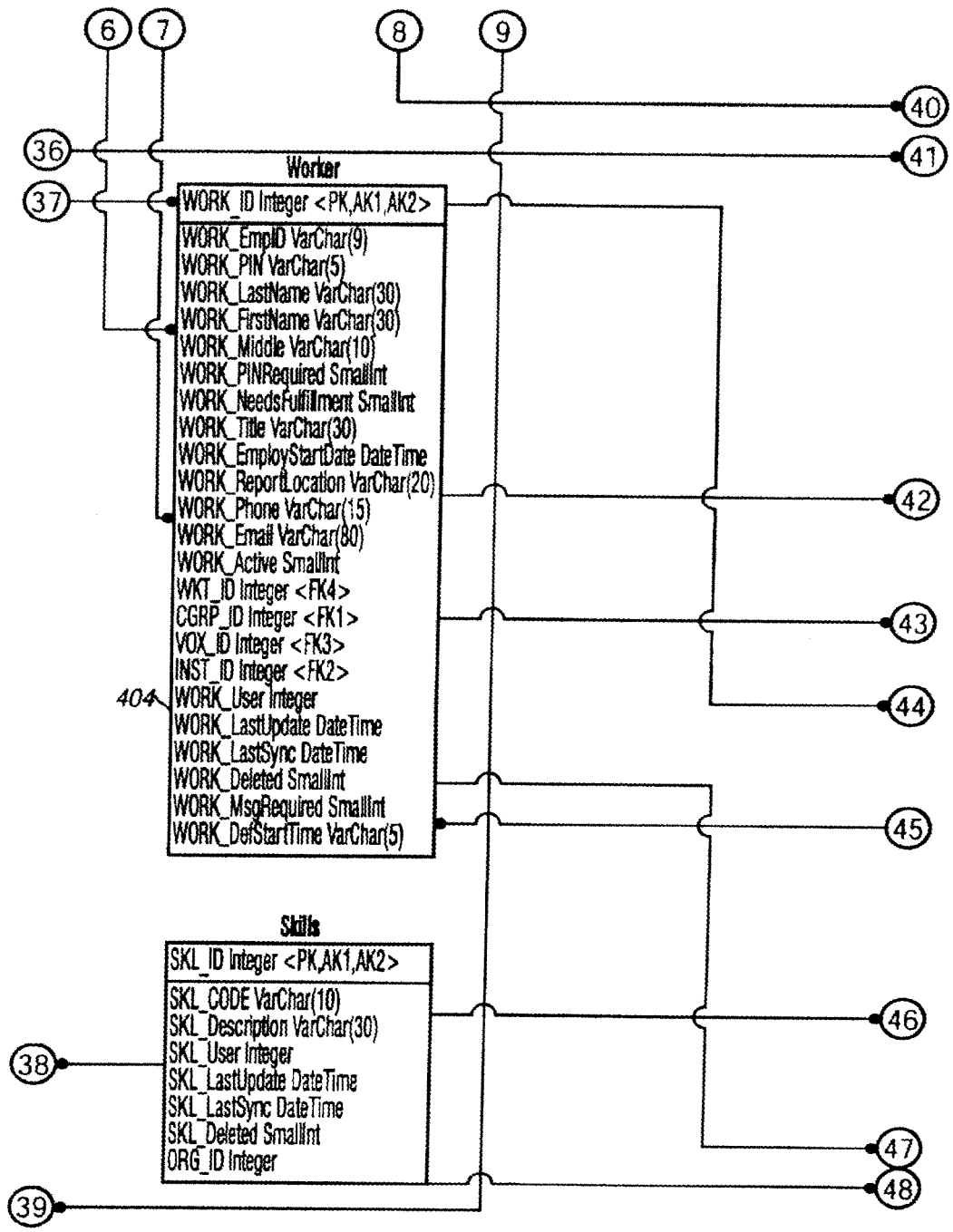
Figure 14H:
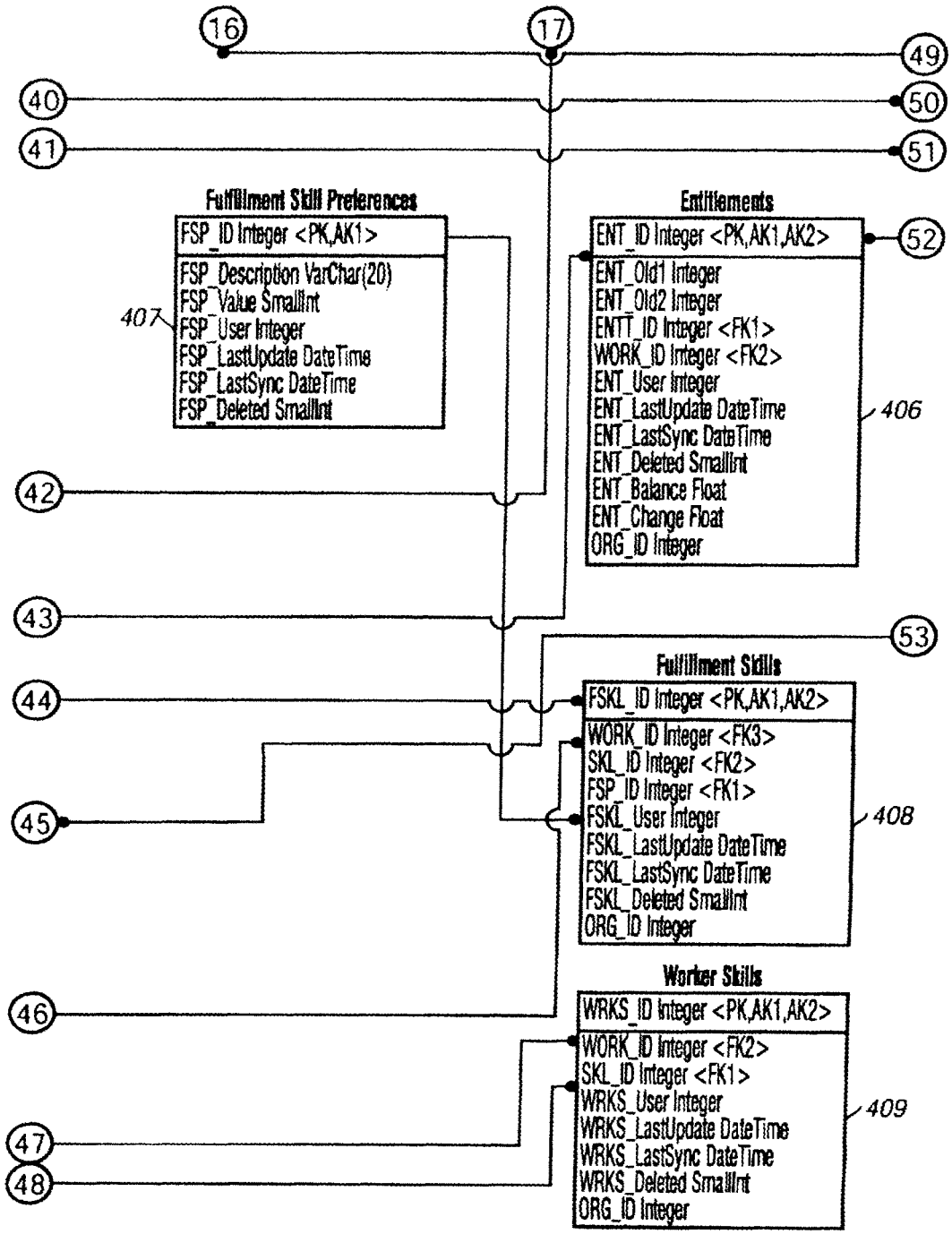
Figure 14I:
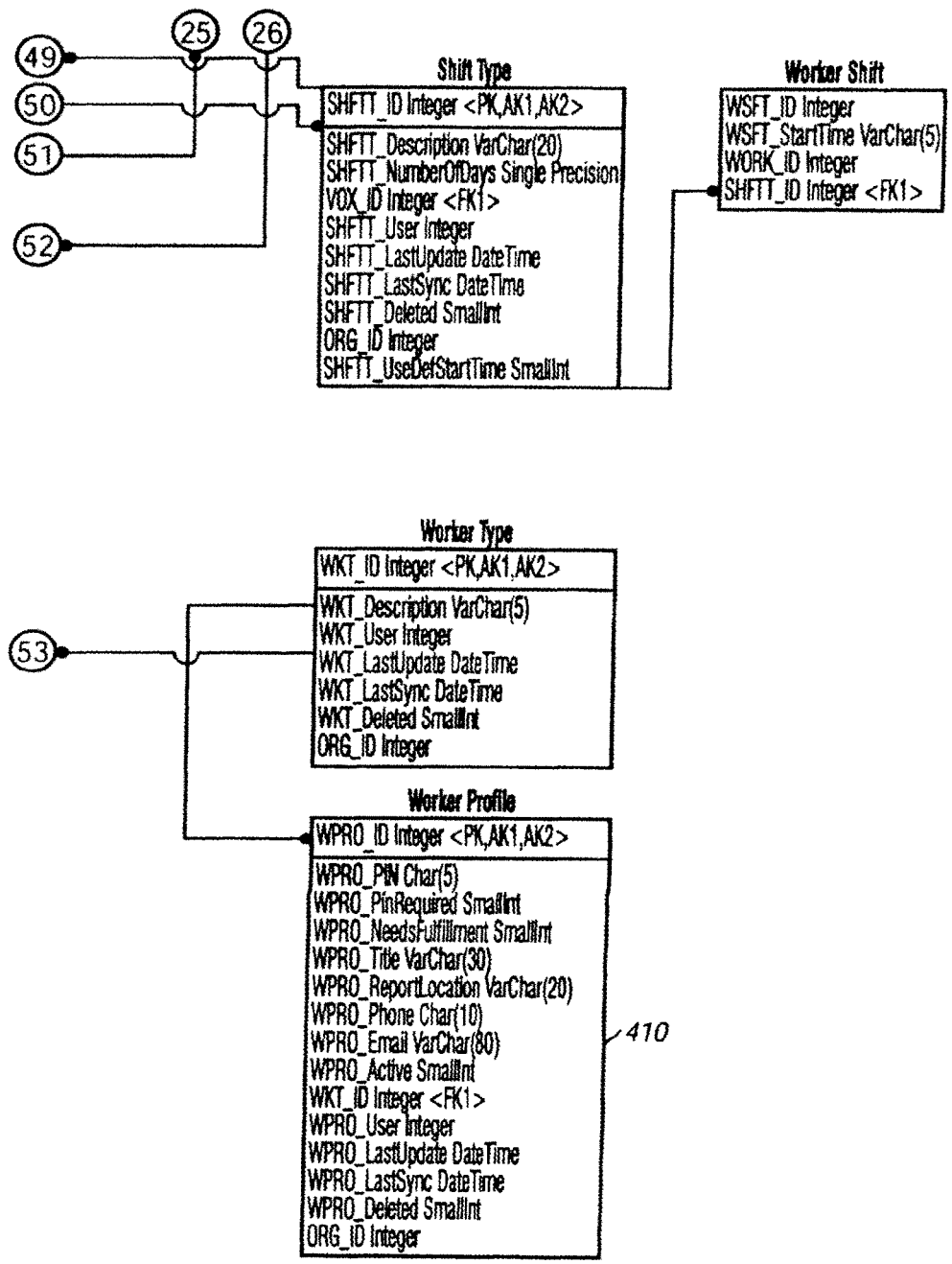
Figure 14J:
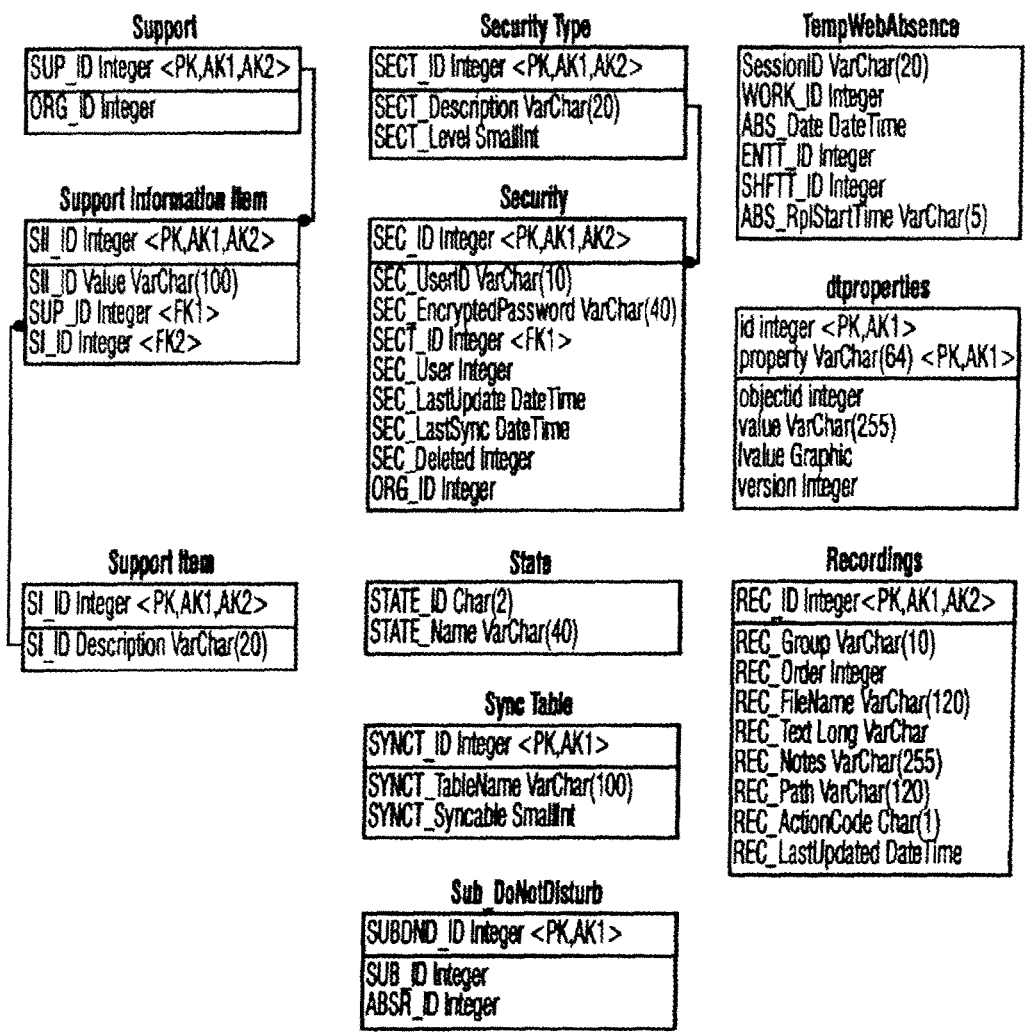

Referring to FIG. 2D, an exemplary flowchart for allowing a substitute worker to secure a position via an instant messaging system according to an embodiment of the present invention is illustrated. At step 81, a substitute worker 32 downloads an instant messaging (IM) applet from the server 12 over a communication network 16, 18 where the applet is installed onto a computing device. Examples of IM applets include, but are not limited to, AOL IM, MSN IM, ICQ IM, and any other instant messaging applets.

At step 82, the system 10 generates a list of positions that need to be filled in response to the substitute worker 32 establishing a connection to the telephone network 16 or computer network 18, In a preferred embodiment, the list of positions is a list of positions that need to be filled in which the substitute worker 32 is qualified to fill. In a preferred embodiment, the list of positions is a list of positions that one or more organizations has chosen to identify the particular substitute worker 32 who established the connection.

At step 83, the system 10 posts or displays the list on the computing device of the substitute worker 32. Using the IM applet, the substitute worker 32 can configure intervals over which an updated list of positions to be filled is retrieved and refreshed on the IM applet.

At step 84, a response to the posted position is received by the system 10 via the IM applet. Thus, the substitute worker 32 is able to interact with the system 10 without accessing the website.

At step 85, the system 10 determines if the substitute worker 32 is qualified to fill-in for the absent worker 30. The determination is made by comparing the qualifications of the potential substitute worker 32 with the qualifications or criteria for the position that are identified by the client organization. If the system 10 determines that the potential substitute worker 32 is qualified, then the system 10 secures the substitute worker 32 to cover for the absent worker 30. If a substitute worker 32 accepts the assignment, the server 12 can relay instructions from the organization or messages from the absent worker 30 to the substitute worker 32 via the IM applet. In a preferred embodiment, the substitute worker 32 can participate in an interactive online message interaction, commonly known as an "online chat" with either an official 28 from the client organization or the worker 30 the substitute worker 32 is temporarily replacing. In addition, the substitute worker 32 can receive a stored message or messages from the client organization or the worker 30 the substitute worker 32 is temporarily replacing.

At step 86, the system 10 notifies the client organization of the position fulfillment. This can be accomplished by generating one or more reports and sending the reports to organization personnel 28, e.g., officials, designated for receipt of the reports. Client organizations can specify different personnel distribution lists for various reports. Reports may be mailed electronically or faxed, or both by server 12. Refer ring to FIG. 12, exemplary reports generated by the system according to an embodiment of the present invention. The system 10 generates summary absentee reports 276, summary substitute assignment reports 278, call history reports 279, and unfulfilled substitute assignment reports 280 with the details of any successful substitute, all calls made, and information regarding any vacancy that could not be filled. The information for said reports is stored in data record 400.

System for Recording Daily Announcements

In another preferred embodiment, the invention may be used to notify designated groups of people over the telephone of daily announcements, including but not limited to school schedules. The client in this embodiment is a school, school district, or business entity.

In this embodiment, the server operates in and transitions between the states shown in FIG. 13C, which include MainMenu (295), RecordSchoolMenu (296), RecordSchool (297), RecordEntTypesMenu (298), RecordEntTypes (299), ErrorState (300), Goodbye (301), and Hangup (302). The events which invoke and transition between these states are shown in FIG. 13C. For example, the system 10 prompts the caller in MainMenu (295) to enter 1 to reach the RecordSchoolMenu (296), in order to record an announcement and 2 to reach the RecordEntTypesMenu (298), in order to record a message regarding entitlement types. Information regarding entitlement types is stored in data record 402. In RecordSchoolMenu (296), the caller is prompted for the valid school recording identification, which prevents unauthorized recordings, and similarly in RecordEntTypesMenu (298), the caller is prompted for the valid Entitlement Type Recording ID, which prevents unauthorized recordings. In RecordSchool (297) and RecordEntTypes (299), if caller presses 1 on the telephone, the system 10 prompts the caller to record a new recording or to verify that the existing recording is acceptable.

Notification System of Patient-Related Information

The invention, in another preferred embodiment, may be used to notify doctors of important patient related information, e.g., patient tests, and patient status. The system 10 receives phone calls and emails regarding the patient related information. The system 10 distributes notifications of the information via voice recorded messages that are announced to many doctors at once using the contact data for the relevant doctors.

Substitute Teller Fulfillment System

In another preferred embodiment, the invention may be used to fulfill the substitute teller requirements in a retail bank. The client in this embodiment is a retail bank or branch office. The data records may contain information related to contact information for each substitute teller, including but not limited to, phone numbers, email addresses, and qualifications. At step 62, the system 10 receives a phone call or email regarding an absence of a teller, and the information regarding this absence is stored in data record 401. At step 64, the system 10 identifies potential substitutes 32 for the absent teller 30. At step 65, the server 12 then contacts the potential substitute tellers, preferably via the telephone network 16 using the IVR system 24. During step 65, the server 12 proceeds in and transitions between the states in FIG. 13D, which include MakeTheCall (308), CallAnalysis (309), Identity (310), Present Request (3110, RejectRequest (312), AcceptRequest (313), ErrorState (314), Hangup (315) and Goodbye (316). The events which invoke these states and transitions between the states are set forth in FIG. 13E. Provided the system was able to contact the substitute teller, the substitute teller is able to accept or reject the position.

Alternatively, the client may have a pool of floating tellers who fill the vacancies in the bank in a given day. The server 12 then contacts the floating tellers, preferably by telephone, email, or facsimile to inform the floating teller to report to a particular branch office. If the server 12 attempts to contact the floating tellers via facsimile, the server 12 proceeds in and transitions between the states set forth in FIG. 13F. The possible states of the server include MakeTheCall (317), CallAnaylsis (318), FaxSend (319), ErrorState (320), Goodbye (321) and Hangup (322). FIG. 13F sets forth the events which trigger these states and the transitions between these states.

Upon acceptance by a substitute teller or floating teller or exhaustion of the list of substitute tellers or floating tellers, the system 10 generates reports detailing who is absent, who was contacted regarding the position, who has accepted the position and the qualifications of the substitute or floating teller. The information compiled in the reports is stored in data record 400.

Worker Substitute Fulfillment System

The invention, in another preferred embodiment, may be used to fulfill the substitute worker requirements for workers, including but not limited to, fire police, security staff, ambulance workers, wait staff, cooks, bus boys, cashiers, sales people, production line workers, pilots and flight attendants. The data records may contain information related to contact information for each substitute worker, including but not limited to, phone numbers, electronic identifiers, email addresses, and qualifications, and the shifts worked by the workers. At step 62, the system 10 receives a phone call or email regarding an absence of a worker, and stores this information in data record 401. At step 64, the system 10 identifies potential substitutes 32 for the absent worker 30. At step 65, the server 12 then contacts the potential substitute workers 30, who are not working the specified shift, preferably using the IVR system 24 and telephone network 16. Provided the system 10 was able to contact the substitute worker 32, the substitute worker 32 is able to accept or reject the position. During step 65, the server proceeds in and transitions between the states in FIG. 13E, which include MakeTheCall (308), CallAnalysis (309), Identity (310), Present Request (3110, RejectRequest (312), AcceptRequest (313), ErrorState (314), Hangup (315) and Goodbye (316). The events which invoke these states and transitions between the states are set forth in FIG. 13E. Provided the system was able to contact the substitute worker, the substitute worker is able to accept or reject the position.

Temporary Worker Agency Fulfillment System

In another preferred embodiment, the invention may be used to fulfill the substitute worker requirements through a temporary worker agency. This embodiment of the invention may be used to find substitutes for material moving and equipment operators, nurses, doctors, x-ray technicians, physical therapy workers, and surgical assistants. The client in this embodiment is a temporary worker agency. The data records may contain information related to contact information for each substitute worker, including but not limited to, phone numbers, email addresses, particular position sought and qualifications. At step 62, the system 10 receives a phone call or email from a customer of the client designating the position to be filled, and the information is stored in data record 401. Additionally, the absent worker of the client's customer may directly contact the system 10 preferably via telephone or email. At step 64, the system 10 identifies potential substitutes 32 for the absent teller 30.

At step 65, the server 12 then contacts the potential substitutes with the requisite qualifications, preferably using the IVR system 24 and telephone network 16. Provided the system was able to contact the substitute 32, the substitute 32 is able to accept or reject the position. During step 65, the server 12 proceeds in and transitions between the states in FIG. 13E, which include MakeTheCall (308), CallAnalysis (309), Identity (310), PresentRequest (3110, RejectRequest (312), AcceptRequest (313), ErrorState (314), Hangup (315) and Goodbye (316). The events which invoke these states and transitions between the states are set forth in FIG. 13E.

The system 10 generates reports detailing who is absent, who was contacted regarding the position, who has accepted the position and the qualifications of the substitute. According the client's instructions, these reports may be sent to the client and the client's customers. Reports may be customized to show the information required by each of the client's customers, said information in data record 400.

Notification System for Union Policies and Benefits

In another preferred embodiment, the invention may be used to notify union members of policies and benefits. The client is a union or unionized organization. The data records may contain information related to contact information for each member, including but not limited to, phone numbers, email addresses, position and employer. At step 62, the system 10 receives a phone call or email from the client designating new policies or benefits for union members, or business matters for the union. At step 65, the server 12 then contacts the members who are affected by the policies, benefits or business matters, preferably using the IVR system 24 and telephone network 16. The system 10 generates reports detailing who was successfully and unsuccessfully contacted.

System for Recording Absences and Entitlements

In another preferred embodiment, the invention may be used to record absences for a business entity. The client is a business entity, such as a corporation. The data records may contain information related to contact information for each worker, including but not limited to, schedule, phone numbers, email addresses, position and entitled vacation, sick and personal time. The system 10 receives a phone call or email from a worker designating an absence and reason for the absence, including but not limited to sick time, vacation time and personal time, and stores the information in data record 401. The system 10 generates reports from data record 400 detailing who is absent, and the absent worker's record for absences including the type of absence. These reports may include sick time, vacation time and personal time used and remaining.

System for Idle Temporary Worker Auctions

In another preferred embodiment, the invention may be used to allow different clients to bid for temporary workers. The client would designate the required skills and pertinent information for the temporary worker, e.g., the required degrees, the required experience, the geographical location of the position and the dates of the position. Additionally, the client would designate how much it was willing to pay for the temporary worker. The system 10 then processes all requests for temporary workers for the date and time required and fulfills the requests based upon the highest bidder receiving the most qualified temporary worker for the position first, then the next highest bidders request is fulfilled and so on until all requests are fulfilled or no acceptable temporary workers are available.

The substitute fulfillment, information compilation or notification database 34 is depicted in FIGS. 14A-14J and, more particularly, from data records 400 to 410. The states in which and between which the system operates are shown in FIGS. 13A-13H.

Although the invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims.

The invention claimed is:

1. A position fulfillment system comprising:
  one or more databases comprising:
    position records for positions of one or more organizations, the respective position records comprising required skill information for the respective positions and worksite location information for the respective positions; and worker records, the respective worker records having skill information for the respective workers;

a server, comprising one or more computers, coupled for accessing the one or more databases, the server configured with program code, when executed, to:

provide a respective worker web page from the server for each of multiple of the workers of the one or more organizations, each of the respective web pages accessed by a respective one of the respective workers with a respective personal identifier and that receives details of a future absence of the respective worker for his/her respective position;

receive, from the server, information about a plurality of the respective positions to be filled at one or more locations associated with the one or more organizations, and update the one or more databases, the receive operation comprising received details of a future absence from a first one of the multiple workers;

dynamically generate, from the server, a plurality of lists of one or more workers, each generated list comprising one or more workers qualified to fill one of the respective positions to be filled at one of the one or more locations, using the worker records associated with the respective workers and the position record for the respective position, wherein multiple of the lists comprise a plurality of workers, wherein a first one of the lists is generated for the position of the first worker after receiving the details of the future absence from the first worker, with the list based at least in part on the required skill information for the respective position of the first worker from the one or more databases;

post offers for acceptance of the positions, from the server on a website, to multiple workers listed on the generated lists for the plurality of the positions, wherein the respective offers indicate directly or indirectly respective worksite locations for the respective positions;

receive, from the server, on the website, an acceptance from one of the workers agreeing to fill the position of the first worker; and secure immediately, using the server, in response to the receiving the acceptance, the position of the first worker for the one worker, the securing comprising halting, at the server, on-going fulfillment processing of the position of the first worker with any other worker thereby denying/rejecting any acceptance from any other worker.

2. The system of claim 1, wherein the receive information about a plurality of the respective positions to be filled operation is by at least one communication link selected from the group consisting of a telephone communication link, and an Internet communication link.

3. The system of claim 1, further comprising:
an interactive voice response system controlled at least in part using the one or more computers, configured to automatically call in sequence workers on one of the generated lists for a different one of the positions via at least one telephone communication link, and wherein the one or more computers are further configured to secure the different position to one of the called workers in response to receiving an acceptance of the different position from the one called worker via the interactive voice response system.

4. The system of claim 1, wherein the workers are substitute teachers.

5. The system of claim 1, further comprising:
the one or more computers configured with an automated telephone communication server, and wherein the one or more computers are further configured to:
generate or obtain a list of one or more preferred workers for the position of the first worker to be filled;

call via the automated telephone communication server, using the one or more computers, one or more of the workers on the list of one or more preferred workers;

communicate, using the one or more computers, with a called one of the workers on the list of one or more preferred workers by the telephone communication server to fulfill the position of the first worker to be filled at a time when the acceptance is received; and wherein the secure operation is configured to halt, using the one or more computers, fulfillment of the position of the first worker with the called one of the workers.

6. The system of claim 1,
wherein the one or more computers are further configured to receive an acceptance from one of the workers by an automated telephone communication link.

7. The system of claim 1, wherein the one or more computers comprise a single server that is coupled to a telephony hardware interface and is coupled to one or more routers coupled to the Internet.

8. The system of claim 1, wherein the one or more computers comprise a first server that is coupled to a telephony hardware interface and a second server coupled to one or more routers coupled to the Internet.

9. The system of claim 1, wherein the worker records comprise information associated with the respective workers comprising worker identification, position information, qualifications, entitlement information, and historical information of absences;

wherein the one or more computers are further configured to
receive, using the one or more computers, new information about a worker absence; and update automatically, using the one or more computers, the one or more databases with the new information about the worker absence.

10. A computer-readable medium bearing instructions being arranged to cause one or more computers, upon execution thereof, to perform the steps:
accessing, using the one or more computers, one or more databases comprising:

position records for one or more organizations, the respective position records comprising required skill information for the respective positions and worksite location information for the respective positions; and worker records, the respective worker records having skill information for the respective workers;

providing a respective worker web page, from a server configured in the one or more computers, for each of multiple of the workers of the one or more organizations, each of the respective web pages accessed by a respective one of the respective workers with a respective personal identifier and that receives details of a future absence of the respective worker for his/her respective position;

receiving, from the server, information about a plurality of the respective positions to be filled at one or more locations associated with the one or more organizations, and updating the one or more databases, the receiving step comprising receiving details of a future absence from a first one of the multiple workers;

dynamically generating, from the server, a plurality of lists of one or more workers, each generated list comprising one or more workers qualified to fill one of the respective positions to be filled at one of the one or more locations, using the worker records associated with the respective workers and the position record for the respective position, wherein multiple of the lists comprise a plurality of workers, wherein a first one of the lists is generated for the position of the first worker after receiving the details of the future absence from the first worker, with the list based at least in part on the required skill information for the respective position of the first worker from the one or more databases;

posting offers for acceptance of the positions from the server on a website, to multiple workers listed on the generated lists for the plurality of the positions, wherein the respective offers indicate directly or indirectly respective worksite locations for the respective positions;

receiving, from the server on the website, an acceptance from one of the workers agreeing to fill the position of the first worker; and securing immediately, using the server, in response to the receiving the acceptance, the position of the first worker for the one worker, the securing comprising halting, at the server, on-going fulfillment processing of the one position with any other worker thereby denying/rejecting any acceptance from any other worker.

11. A method comprising:

accessing, using one or more computers, one or more databases comprising:
  position records for positions of one or more organizations, the respective position records comprising required skill information for the respective positions and worksite location information for the respective positions; and
  worker records, the respective worker records having skill information for the respective workers;

providing a respective worker web page, from a server configured in the one or more computers, for each of multiple of the workers of the one or more organizations, each of the respective web pages accessed by a respective one of the respective workers with a respective personal identifier and that receives details of a future absence of the respective worker for his/her respective position;

receiving, from the server, information about a plurality of the respective positions to be filled at one or more locations associated with the one or more organizations, and updating the one or more databases, the receiving step comprising receiving details of a future absence from a first one of the multiple workers;

dynamically generating, from the server, a plurality of lists of one or more workers, each generated list comprising one or more workers qualified to fill one of the respective positions to be filled at one of the one or more locations, using the worker records associated with the respective workers and the position record for the respective position, wherein multiple of the lists comprise a plurality of workers, wherein a first one of the lists is generated for the position of the first worker after receiving the details of the future absence from the first worker, with the list based at least in part on the required skill information for the respective position of the first worker from the one or more databases;

posting offers for acceptance of the positions, from the server on a website, to multiple workers listed on the generated lists for the plurality of the positions, wherein the respective offers indicate directly or indirectly respective worksite locations for the respective positions;

receiving, from the server on the website, an acceptance from one of the workers agreeing to fill in one of the positions; and securing immediately, using the server, in response to the receiving the acceptance, the position of the first worker for the one worker, the securing comprising halting, at the server, on-going fulfillment processing of the one position with any other worker thereby denying/rejecting any acceptance from any other worker.

12. The method of claim 11, wherein the receiving information about a plurality of the respective positions to be filled step comprises receiving by a communications link selected from the group consisting of a telephone communication link, and an Internet communication on link.

13. The method of claim 11, further comprising:
automatically calling in sequence via an interactive voice response system workers on one of the generated lists for a different one of the positions via at least one telephone communication link;

receiving via the interactive voice response system an acceptance from one of the called workers agreeing to fill in the different position; and securing, using the one or more computers, in response to the receiving the acceptance, the given position to the called worker that provided the acceptance for the different position.

14. The method of claim 11, wherein the workers are substitute teachers.

15. The method of claim 11, wherein the one or more computers are configured with an automated telephone communication server, and further comprising:
generating or obtaining a list of one or more preferred workers for the position of the first worker to be filled;

calling via the automated telephone communication server using the one or more computers one or more of the workers on the list of one or more preferred workers;

communicating, using the one or more computers, with a called one of the workers on the list of one or more preferred workers by the telephone communication server to fulfill the position of the first worker at a time when the acceptance is received; and wherein the securing step comprises halting, using the one or more computers, fulfillment of the position of the first worker with the called one of the workers.

16. The method of claim 11,
wherein the receiving an acceptance step comprises receiving an acceptance from one of the workers by an automated telephone communication link.

17. The method of claim 11, wherein the worker records comprise information associated with the respective workers comprising worker identification, position information, qualifications, entitlement information, and historical information of absences; and further comprising:
receiving, using the one or more computers, new information about a worker absence; and updating automatically, using the one or more computers, the one or more databases with the new information about the worker absence.

* * * * *